United States Patent
Ribi

(10) Patent No.: US 10,570,294 B2
(45) Date of Patent: *Feb. 25, 2020

(54) COMPOUNDS FOR REDUCING BACKGROUND COLOR IN COLOR CHANGE COMPOSITIONS

(71) Applicant: Segan Industries, Inc., Burlingame, CA (US)

(72) Inventor: Hans O. Ribi, Hillsborough, CA (US)

(73) Assignee: Segan Industries, Inc., Burlingame, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 15/354,872

(22) Filed: Nov. 17, 2016

(65) Prior Publication Data
US 2017/0066931 A1  Mar. 9, 2017

Related U.S. Application Data

(63) Continuation of application No. 14/213,814, filed on Mar. 14, 2014, now Pat. No. 9,528,004.

(60) Provisional application No. 61/790,612, filed on Mar. 15, 2013.

(51) Int. Cl.
| | | |
|---|---|---|
| *C08J 3/22* | (2006.01) | |
| *C09D 5/29* | (2006.01) | |
| *C09D 133/02* | (2006.01) | |
| *C09D 5/00* | (2006.01) | |
| *B41M 5/28* | (2006.01) | |
| *B41M 5/30* | (2006.01) | |
| *B41M 5/323* | (2006.01) | |
| *B41M 5/333* | (2006.01) | |
| *B41M 5/337* | (2006.01) | |
| *B41M 5/34* | (2006.01) | |
| *C09D 11/50* | (2014.01) | |
| *C08K 5/103* | (2006.01) | |

(52) U.S. Cl.
CPC ............... *C09D 5/29* (2013.01); *B41M 5/284* (2013.01); *B41M 5/287* (2013.01); *B41M 5/305* (2013.01); *B41M 5/323* (2013.01); *B41M 5/3333* (2013.01); *B41M 5/3372* (2013.01); *B41M 5/34* (2013.01); *C08J 3/22* (2013.01); *C09D 5/00* (2013.01); *C09D 11/50* (2013.01); *C09D 133/02* (2013.01); *B41M 2205/04* (2013.01); *C08J 2397/02* (2013.01); *C08K 5/103* (2013.01)

(58) Field of Classification Search
CPC ................ C08J 3/22; C08J 2397/02

USPC .......................................................... 524/317
See application file for complete search history.

(56) References Cited

U.S. PATENT DOCUMENTS

| | | |
|---|---|---|
| 3,309,274 A | 3/1967 | Brilliant |
| 3,710,115 A | 1/1973 | Jubb |
| 3,999,946 A | 12/1976 | Patel et al. |
| 4,001,446 A | 1/1977 | Hood |
| 4,150,106 A | 4/1979 | Assal et al. |
| 4,208,186 A | 6/1980 | Patel |
| 4,238,352 A | 12/1980 | Patel |
| 4,276,190 A | 6/1981 | Patel |
| 4,339,240 A | 7/1982 | Patel et al. |
| 4,339,951 A | 7/1982 | Yee et al. |
| 4,344,909 A | 8/1982 | De Blauwe |
| 4,381,260 A | 4/1983 | Chu et al. |
| 4,389,217 A | 6/1983 | Baughman et al. |
| 4,439,346 A | 3/1984 | Patel et al. |
| 4,520,376 A | 5/1985 | Morishita et al. |
| 4,629,676 A | 12/1986 | Hayakawa et al. |
| 4,667,869 A | 5/1987 | Gen et al. |
| 4,705,513 A | 11/1987 | Sheldon et al. |
| 4,717,710 A | 1/1988 | Shimizu et al. |
| 4,721,769 A | 1/1988 | Rubner |
| 4,737,463 A | 4/1988 | Bhattacharjee et al. |
| 4,847,066 A | 7/1989 | Honigs et al. |
| 4,853,235 A | 8/1989 | Tomomasu |
| 4,859,538 A | 8/1989 | Ribi |
| 4,871,811 A | 10/1989 | Gaku et al. |
| 4,892,677 A | 1/1990 | Preziosi et al. |
| 4,931,051 A | 6/1990 | Castello |
| 4,957,949 A | 9/1990 | Kamada et al. |
| 4,997,741 A | 3/1991 | Watanabe |
| 5,006,494 A | 4/1991 | Virkar |
| 5,028,792 A | 7/1991 | Mullis |

(Continued)

FOREIGN PATENT DOCUMENTS

| | | |
|---|---|---|
| CA | 2070749 C | 3/2002 |
| EP | 353650 A2 | 2/1990 |

(Continued)

OTHER PUBLICATIONS

"Consumable". Dictionary.com. Online. Internet. Accessed on Mar. 14, 2006. <http://dictionary.reference.com/search?q=consumable>.

(Continued)

*Primary Examiner* — Kelechi C Egwim
(74) *Attorney, Agent, or Firm* — Khin K. Chin; Bret E. Field; Bozicevic, Field & Francis LLP

(57) ABSTRACT

Aspects of the invention include color change compositions having a color former and color developer composition that transitions from a first color state to a second color state upon application of an applied stimulus and an amount of a copolymer sufficient to eliminate background color of the color former and color developer composition during transition from the first color state to the second color state. Methods for preparing and devices employing the color change compositions of the invention are also described.

14 Claims, No Drawings

(56) References Cited

U.S. PATENT DOCUMENTS

| | | | |
|---|---|---|---|
| 5,051,597 A | 9/1991 | Lewis et al. |
| 5,053,339 A | 10/1991 | Patel |
| 5,085,801 A | 2/1992 | Thierry et al. |
| 5,144,112 A | 9/1992 | Wyatt et al. |
| 5,156,810 A | 10/1992 | Ribi |
| 5,156,819 A | 10/1992 | Ross |
| 5,176,905 A | 1/1993 | Ohno et al. |
| 5,189,281 A | 2/1993 | Wyatt et al. |
| 5,208,132 A | 5/1993 | Kamada et al. |
| 5,250,492 A | 10/1993 | Dotson et al. |
| 5,273,360 A | 12/1993 | Wyatt et al. |
| 5,387,798 A | 2/1995 | Funakoshi et al. |
| 5,411,835 A | 5/1995 | Brinser |
| 5,415,544 A | 5/1995 | Oxman et al. |
| 5,415,999 A | 5/1995 | Saul et al. |
| 5,420,000 A | 5/1995 | Patel et al. |
| 5,514,635 A | 5/1996 | Filo |
| 5,581,090 A | 12/1996 | Goudjil |
| 5,599,525 A | 2/1997 | Hsu et al. |
| 5,612,541 A | 3/1997 | Hoffmann et al. |
| 5,618,735 A | 4/1997 | Saul et al. |
| 5,622,872 A | 4/1997 | Ribi |
| 5,628,934 A | 5/1997 | Ohno et al. |
| 5,685,641 A | 11/1997 | Ribi |
| 5,788,375 A | 8/1998 | Parker et al. |
| 5,817,599 A | 10/1998 | Iida et al. |
| 5,895,718 A | 4/1999 | Ishimura et al. |
| 5,918,981 A | 7/1999 | Ribi |
| 5,989,573 A | 11/1999 | Remy |
| 6,022,648 A | 2/2000 | Jacobson et al. |
| 6,046,455 A | 4/2000 | Ribi et al. |
| 6,103,217 A | 8/2000 | Charych |
| 6,103,459 A | 8/2000 | Diel |
| 6,160,084 A | 12/2000 | Langer et al. |
| 6,183,772 B1 | 2/2001 | Charych et al. |
| 6,241,913 B1 | 6/2001 | Angelopoulos et al. |
| 6,277,652 B1 | 8/2001 | Jo et al. |
| 6,306,598 B1 | 10/2001 | Charych et al. |
| 6,330,730 B1 | 12/2001 | Davies et al. |
| 6,389,636 B1 | 5/2002 | Savill |
| 6,465,791 B1 | 10/2002 | Ribi et al. |
| 6,468,759 B1 | 10/2002 | Charych |
| 6,472,214 B2 | 10/2002 | Patel |
| 6,485,300 B1 | 11/2002 | Muller et al. |
| 6,528,954 B1 | 3/2003 | Lys et al. |
| 6,544,925 B1 | 4/2003 | Prusik et al. |
| 6,579,826 B2 | 6/2003 | Furuya et al. |
| 6,607,744 B1 | 8/2003 | Ribi |
| 6,613,363 B1 | 9/2003 | Li |
| 6,623,698 B2 | 9/2003 | Kuo |
| 6,670,436 B2 | 12/2003 | Burgath et al. |
| 6,787,108 B2 | 9/2004 | Ribi |
| 6,866,863 B2 | 3/2005 | Ribi |
| 7,223,270 B2 | 5/2007 | Altshuler et al. |
| 7,776,371 B2 | 8/2010 | Ribi |
| 7,813,025 B2 | 10/2010 | Ribi |
| 8,569,208 B1 | 10/2013 | Ribi |
| 8,617,900 B2 | 12/2013 | Ribi |
| 9,746,380 B2 * | 8/2017 | Ribi ...................... A47G 19/00 |
| 2002/0034475 A1 | 3/2002 | Ribi |
| 2002/0102674 A1 | 8/2002 | Anderson |
| 2003/0103905 A1 | 6/2003 | Ribi |
| 2003/0143188 A1 | 7/2003 | Ribi |
| 2003/0226978 A1 | 12/2003 | Ribi et al. |
| 2004/0063848 A1 | 4/2004 | Olson et al. |
| 2005/0036300 A1 | 2/2005 | Dowling et al. |
| 2005/0088355 A1 | 4/2005 | Kralovec et al. |
| 2005/0109984 A1 | 5/2005 | Potyrailo et al. |
| 2005/0193510 A1 | 9/2005 | Kemp |
| 2006/0054838 A1 | 3/2006 | Ribi et al. |
| 2007/0053856 A1 | 3/2007 | Ribi et al. |
| 2007/0071680 A1 | 3/2007 | Ribi |
| 2007/0251912 A1 | 11/2007 | Sixou et al. |
| 2007/0259598 A1 | 11/2007 | Ribi |
| 2008/0296513 A1 | 12/2008 | Ribi et al. |
| 2009/0130030 A1 | 5/2009 | Ribi |
| 2009/0206080 A1 | 8/2009 | Ribi |
| 2010/0012018 A1 | 1/2010 | Ribi |
| 2010/0029004 A1 | 2/2010 | Ribi |
| 2010/0234494 A1 | 9/2010 | Fischer et al. |
| 2010/0247223 A1 | 9/2010 | Ribi |
| 2010/0322874 A1 | 12/2010 | Ribi |
| 2011/0008498 A1 | 1/2011 | Ribi |
| 2011/0091391 A1 | 4/2011 | Ribi |
| 2011/0140057 A1 | 6/2011 | Ribi |
| 2011/0148984 A1 | 6/2011 | Ribi |
| 2011/0165693 A1 | 7/2011 | Ribi |
| 2011/0211248 A1 | 9/2011 | Ribi |
| 2011/0217544 A1 | 9/2011 | Young et al. |
| 2012/0266806 A1 | 10/2012 | Ribi |
| 2013/0061798 A1 | 3/2013 | Ribi |
| 2013/0077148 A1 | 3/2013 | Ribi |
| 2014/0106963 A1 | 4/2014 | Ribi |
| 2014/0145112 A1 | 5/2014 | Ribi |

FOREIGN PATENT DOCUMENTS

| | | |
|---|---|---|
| EP | 0610072 A1 | 8/1994 |
| EP | 1041447 A1 | 10/2000 |
| EP | 1229089 A1 | 8/2002 |
| EP | 1882726 A1 | 1/2008 |
| EP | 2489521 A1 | 8/2012 |
| JP | S61154993 A | 7/1986 |
| JP | S61250080 A | 11/1986 |
| JP | S63-160897 | 10/1988 |
| JP | S64-6992 | 1/1989 |
| JP | 3033538 U | 1/1997 |
| JP | 3034028 U | 2/1997 |
| JP | 10-017622 A | 1/1998 |
| JP | 2002-6280 A | 1/2002 |
| JP | 2002-137543 A | 5/2002 |
| JP | 2006-257163 A | 9/2006 |
| JP | 2008-031331 A | 2/2008 |
| WO | WO99/39167 A1 | 8/1999 |
| WO | WO02/00920 A2 | 1/2002 |
| WO | WO03/037391 A1 | 5/2003 |
| WO | WO2004090629 A2 | 10/2004 |
| WO | WO2005028524 A1 | 3/2005 |
| WO | WO2005029163 A1 | 3/2005 |
| WO | WO2005036109 A2 | 4/2005 |
| WO | WO2005123023 A1 | 12/2005 |
| WO | WO2007111702 A2 | 10/2007 |
| WO | WO2008051550 A2 | 5/2008 |
| WO | WO2008079357 A2 | 7/2008 |

OTHER PUBLICATIONS

"Food Facts", U.S. Food and Drug Administration, Brochure: Jan. 1993, pp. 1-6.

Database WPI Week 200228; Thompson Scientific, London GB; AN 2002-2215741 XP002535493, 2002.

Dr. Fresh Fly Series Children's Toothbrush; http://www.dentist.neUfire-fly-toothbrush.asp (Nov. 19, 2008) (4pp).

Keum et al. Bull Korean Chem. Soc. (1995) 16:1007.

Lendlein et al. "Shape-Memory Polymers". Angew. Chem. In. Ed. (Jun. 2002) pp. 2035-2057.

Ma et al., "Colorimetric Detection of *Escherichia coli* by Polydiacetylene Vesicles Functionnalized with Glycolipid", Journal of the American Chemical Society, vol. 120, No. 48, pp. 12678-12679 (1998).

Zhanfang et al., "Color-changeable vesicles of polydiacetylenic matrix incorporating glycolipid based on physical force", Acta Physico-Chimica Sinica, 15(2): 101-104 (1999).

Oral-B. Laboratories, Inc.; http://www.oralb.com.en-us/ (Nov. 19, 2008) (1p).

Tesini et al., The Effect of a Color Changing Toothbrush With and Without Instruction on the Duration of Tooth Brushing (Pediatr. Dent. 19941 16:224-226) Abstract AAPD Journal. http://www.aapd.org/searcharticles/article.asp?ARTICLE_ID=897 (1994) (1 p).

(56) References Cited

OTHER PUBLICATIONS

Ultra-Clean™ Specific Toohbrush Sanitizer, UV Solutions; LLC., MA; http://www.uv-ultraclean.com (Nov. 19, 2008) 2pp.

* cited by examiner

COMPOUNDS FOR REDUCING BACKGROUND COLOR IN COLOR CHANGE COMPOSITIONS

CROSS-REFERENCE TO RELATED APPLICATIONS

This application is a continuation of U.S. patent application Ser. No. 14/213,814 filed Mar. 14, 2014, now U.S. Pat. No. 9,528,004. Pursuant to 35 U.S.C. § 119 (e), this application claims priority to the filing dates of U.S. Provisional Patent Application Ser. No. 61/790,612 filed Mar. 15, 2013; the disclosure of which application is herein incorporated by reference.

INTRODUCTION

Many products, including consumer and industrial products, are more effectively used by an end user when they include a feature that indicates that the product has undergone exposure to a particular stimulus or by a degree of use. One example of an indicator feature which can indicate that a product has undergone exposure to stimuli is a color indicator. Color indicators can either indicate a change in condition or a degree of use through a change from colored to uncolored, from uncolored to colored or through a change from one color to a different color.

Consumer products may be able to be more effective and deliver more benefits to end users by incorporating a suitable color indicator so that the end user is unambiguously aware of any exposure to stimuli or intends on applying the stimuli to achieve a desired result. It is desirable, where the indicator is a color change, for the color indicator to have a distinct, or sharp, color change and a rapid response time to aid the user in identifying that the product has undergone exposure to a particular stimulus.

Thus, there remains a need for a composition that shows rapid, distinct and acute color changes for use in a variety of different industrial and commercial products where color change offers unambiguous determination if stimuli has been applied.

SUMMARY

Aspects of the invention include color change compositions having a color former and color developer composition that transitions from a first color state to a second color state upon application of an applied stimulus and an amount of a copolymer sufficient to eliminate background color of the color former and color developer composition during transition from the first color state to the second color state. Methods for preparing and devices employing the color change compositions of the invention are also described.

In embodiments of the invention, color change compositions include an amount of a copolymer sufficient to eliminate background color during transition from a first color state to a second color state which has a formula (I):

Formula (I)

where n is an integer from 10 to 1000; m is an integer from 10 to 1000; and R is an alkyl, substituted alkyl, alkenyl, substituted alkenyl, alkynyl, substituted alkynyl, acyl, substituted acyl, acyloxy, substituted acyloxy, alkoxycarbonyl, substituted alkoxycarbonyl, carboxyl or substituted carboxyl.

In certain embodiments, n is an integer from 10 to 1000; m is an integer from 10 to 1000 and R is an acyloxy group or substituted acyloxy group. Where R is an acyloxy group or substituted acyloxy group, in certain instances, the copolymer is a polymer having formula (II):

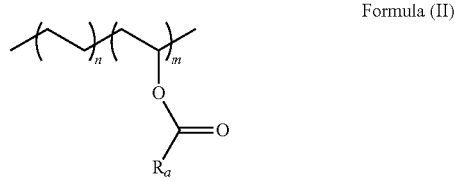

Formula (II)

where n is an integer from 10 to 1000; m is an integer from 10 to 1000; and $R_a$ is hydrogen, alkyl or substituted alkyl. In some embodiments, $R_a$ is a C1-C12 alkyl or a C1-C12 substituted alkyl. Where $R_a$ is a C1-C12 alkyl, in certain instances $R_a$ is a C1-C6 alkyl such as methyl or ethyl. In some embodiments, $R_a$ is methyl. In other embodiments, $R_a$ is ethyl. In certain embodiments, the copolymer of formula (II) is ethyl vinyl acetate.

In certain embodiments, n is an integer from 10 to 1000; m is an integer from 10 to 1000 and R is an alkoxycarbonyl or substituted alkoxycarbonyl. Where R is an alkoxycarbonyl or substituted alkoxycarbonyl, in certain instances, the copolymer is a polymer having formula (III):

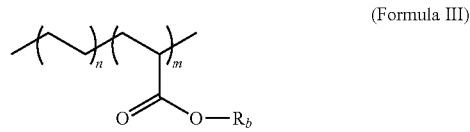

(Formula III)

where n is an integer from 10 to 1000; m is an integer from 10 to 1000; and $R_b$ is hydrogen, alkyl or substituted alkyl. In some embodiments $R_b$ is a C1-C12 alkyl or a C1-C12 substituted alkyl. Where $R_b$ is a C1-C12 alkyl, in certain instances $R_b$ is a C1-C6 alkyl such as methyl or ethyl. In some embodiments, $R_b$ is methyl. In other embodiments, $R_b$ is ethyl. In other embodiments, $R_b$ is propyl. In yet other embodiments, $R_b$ is butyl. In certain embodiments, the copolymer of formula (III) is selected from ethylene methyl acrylate, ethylene ethyl acrylate and ethylene butyl acrylate.

Color change compositions of interest according to certain embodiments include an amount of copolymer which ranges from 0.01% to 15% by weight, such as 0.5% to 12% by weight and including 1% to 10% by weight where the amount of copolymer is sufficient to eliminate background color of the color change composition during transition from a first color state to a second color state.

In embodiments of the invention, the color change composition includes a color former and color developer composition. The color former and color developer composition may be single component systems where a single color former and single color developer are employed in the subject color change compositions. Alternatively, the color former and color developer composition may be a multi-component system where a plurality of color formers are paired with one or more color developers, as desired. In certain embodiments the color former and color developer composition includes one or more color formers and a single color developer. The color former and color developer system may be reversible or irreversible and in certain embodiments, exhibit hysteresis. Further, color former and color developer compositions of interest may be microencapsulated systems where one or both of the color former and color developer are microencapsulated.

Color change compositions may further include additional pigments, coloring agents, dyes and the like, in addition to various excipients, such as anti-oxidants, fillers, preservatives, plasticizers, softening or hardening agents, adhesives, tackifying agents, viscosity modifiers, resins, buffers, among other excipients.

Aspects of the invention also include methods for preparing the subject color change compositions. In embodiments of the invention, methods for preparing color change compositions of interest include combining a color former and color developer composition with an amount of a copolymer to produce a color change composition which changes from a first color state to a second color state upon application of an applied stimulus. In some embodiments, the method includes combining the color former and color developer composition with the copolymer as a color former-color developer pseudo master batch composition. Where the color former and color developer is combined with the copolymer as a pseudo master batch composition, methods may further include preparing the color former-color developer pseudo master batch composition, which includes combining an aqueous slurry of the color former and color developer with a plastic emulsifier (e.g., anionic, cationic or non-ionic) and plastic resin to produce a mixture and flash drying the mixture to produce a color former-color developer pseudo master batch composition. The pseudo master batch may be in the form of a powder, flakes or in granular form.

Devices employing the subject color change compositions are also described. In some embodiments, devices include the color change composition applied to at least one surface of a substrate, in certain instances in the shape of a pattern, word or in a machine readable format. For example, the color change compositions may be employed as an ink printed onto a substrate such as paper, plastic, hard surfaces, soft surfaces, stiff or rigid surfaces, compliant surfaces, printed surfaces, printable surfaces, transparent surfaces, semi-transparent surfaces, opaque surfaces, non-transparent surfaces, skin, finger nails, molded surfaces, flexo-graphic printing surfaces, foam surfaces, expanded plastic surfaces, insulating surfaces, conducting surfaces and conducting ink surfaces.

Selected Definitions of Chemical Terminology

The following chemical terminology has the following meanings unless otherwise indicated. Any undefined terms have their art recognized meanings.

Many general references providing commonly known chemical synthetic schemes and conditions useful for synthesizing the disclosed compounds are available (see, e.g., Smith and March, March's Advanced Organic Chemistry: Reactions, Mechanisms, and Structure, Fifth Edition, Wiley-Interscience, 2001; or Vogel, A Textbook of Practical Organic Chemistry, Including Qualitative Organic Analysis, Fourth Edition, New York: Longman, 1978).

Chemical compounds as described herein can be purified by any of the means known in the art, including chromatographic means, such as high performance liquid chromatography (HPLC), preparative thin layer chromatography, flash column chromatography and ion exchange chromatography. Any suitable stationary phase can be used, including normal and reversed phases as well as ionic resins. See, e.g., Introduction to Modern Liquid Chromatography, 2nd Edition, ed. L. R. Snyder and J. J. Kirkland, John Wiley and Sons, 1979; and Thin Layer Chromatography, ed E. Stahl, Springer-Verlag, New York, 1969.

Depending on the particular embodiment, the compounds described herein may contain one or more chiral centers and/or double bonds and therefore, can exist as stereoisomers, such as double-bond isomers (i.e., geometric isomers), enantiomers or diastereomers. Accordingly, all possible enantiomers and stereoisomers of the compounds including the stereoisomerically pure form (e.g., geometrically pure, enantiomerically pure or diastereomerically pure) and enantiomeric and stereoisomeric mixtures are included in the description of the compounds herein. Enantiomeric and stereoisomeric mixtures can be resolved into their component enantiomers or stereoisomers using separation techniques or chiral synthesis techniques well known to the skilled artisan. The compounds can also exist in several tautomeric forms including the enol form, the keto form and mixtures thereof. Accordingly, the chemical structures depicted herein encompass all possible tautomeric forms of the illustrated compounds. The compounds described also include isotopically labeled compounds where one or more atoms have an atomic mass different from the atomic mass conventionally found in nature. Examples of isotopes that can be incorporated into the compounds disclosed herein include, but are not limited to, $^2$H, $^3$H, $^{11}$C, $^{13}$C, $^{14}$C, $^{15}$N, $^{18}$O, $^{17}$O, etc. In general, all physical forms are equivalent for the uses contemplated herein and are intended to be within the scope of the present disclosure.

As used herein, the term "alkyl" by itself or as part of another substituent refers to a saturated branched or straight-chain monovalent hydrocarbon radical derived by the removal of one hydrogen atom from a single carbon atom of a parent alkane. Typical alkyl groups include, but are not limited to, methyl; ethyl, propyls such as propan-1-yl or propan-2-yl; and butyls such as butan-1-yl, butan-2-yl, 2-methyl-propan-1-yl or 2-methyl-propan-2-yl. In some embodiments, an alkyl group comprises from 1 to 20 carbon atoms. In other embodiments, an alkyl group comprises from 1 to 10 carbon atoms. In still other embodiments, an alkyl group comprises from 1 to 6 carbon atoms, such as from 1 to 4 carbon atoms.

The term "substituted" as used herein refers to a group in which one or more hydrogen atoms are independently replaced with the same or different substituent(s). Typical substituents include, but are not limited to, alkylenedioxy (such as methylenedioxy), -M, —$R^{60}$, —O$^-$, =O, —OR$^{60}$, —SR$^{60}$, —S$^-$, =S, —NR$^{60}$R$^{61}$, =NR$^{60}$, —CF$_3$, —CN, —OCN, —SCN, —NO, —NO$_2$, =N$_2$, —N$_3$, —S(O)$_2$O$^-$, —S(O)$_2$OH, —S(O)$_2$R$^{60}$, —OS(O)$_2$O$^-$, —OS(O)$_2$R$^{60}$, —P(O)(O$^-$)$_2$, —P(O)(OR$^{60}$)(O$^-$), —OP(O)(OR$^{60}$)(OR$^{61}$), —C(O)R$^{60}$, —C(S)R$^{60}$, —C(O)OR$^{60}$, —C(O)NR$^{60}$R$^{61}$, —C(O)O$^-$, —C(S)OR$^{60}$, —NR$^{62}$C(O)NR$^{60}$R$^{61}$, —NR$^{62}$C(S)NR$^{60}$R$^{61}$, —NR$^{62}$C(NR$^{63}$)NR$^{60}$R$^{61}$ and —C(NR$^{62}$)NR$^{60}$R$^{61}$ where M is halogen; R$^{60}$, R$^{61}$, R$^{62}$ and R$^{63}$ are independently hydrogen, alkyl, substituted alkyl, alkoxy, substituted alkoxy, cycloalkyl, substituted cycloalkyl, cycloheteroalkyl, substituted cycloheteroalkyl, aryl, substituted aryl, heteroaryl or substituted heteroaryl, or optionally R$^{60}$ and R$^{61}$ together with the nitrogen atom to which they are bonded form a cycloheteroalkyl or substituted cycloheteroalkyl ring; and R$^{64}$ and $R^{65}$ are independently hydrogen, alkyl, substituted alkyl, aryl, cycloalkyl, substituted cycloalkyl, cycloheteroalkyl, substituted cycloheteroalkyl, aryl, substituted aryl, heteroaryl or substituted heteroaryl, or optionally $R^{64}$ and $R^{65}$ together with the nitrogen atom to which they are bonded form a cycloheteroalkyl or substituted cycloheteroalkyl ring. In certain embodiments, substituents include -M, —$R^{60}$, =O, —$OR^{60}$, —$SR^{60}$, —S$^-$, =S, —$NR^{60}R^{61}$, =$NR^{60}$, —$CF_3$, —CN, —OCN, —SCN, —NO, —$NO_2$, =$N_2$, —$N_3$, —$S(O)_2R^{60}$, —$OS(O)_2O^-$, —$OS(O)_2R^{60}$, —$P(O)(O^-)_2$, —$P(O)(OR^{60})(O^-)$, —$OP(OR^{60})(OR^{61})$, —$C(O)R^{60}$, —$C(S)R^{60}$, —$C(O)OR^{60}$, —$C(O)NR^{60}R^{61}$, —$C(O)O^-$, —$NR^{62}C(O)NR^{60}R^{61}$. In certain embodiments, substituents include -M, —$R^{60}$, =O, —$OR^{60}$, —$SR^{60}$, —$NR^{60}R^{61}$, —$CF_3$, —CN, —$NO_2$, —$S(O)_2R^{60}$, —$P(O)(OR^{60})(O^-)$, —$OP(O)(OR^{60})(OR^{61})$, —$C(O)R^{60}$, —$C(O)OR^{60}$, —$C(O)NR^{60}R^{61}$, —$C(O)O^-$. In certain embodiments, substituents include -M, —$R^{60}$, =O, —$OR^{60}$, —$SR^{60}$, —$NR^{60}R^{61}$, —$CF_3$, —CN, —$NO_2$, —$S(O)_2R^{60}$, —$OP(O)(OR^{60})(OR^{61})$, —$C(O)R^{60}$, —$C(O)OR^{60}$, —$C(O)O^-$, where $R^{60}$, $R^{61}$ and $R^{62}$ are as defined above. For example, a substituted group may bear a methylenedioxy substituent or one, two, or three substituents selected from a halogen atom, a (1-4C)alkyl group and a (1-4C)alkoxy group.

"Alkanyl" by itself or as part of another substituent refers to a saturated branched, straight-chain or cyclic alkyl radical derived by the removal of one hydrogen atom from a single carbon atom of an alkane. Typical alkanyl groups include, but are not limited to, methanyl; ethanyl; propanyls such as propan-1-yl, propan-2-yl (isopropyl), cyclopropan-1-yl, etc.; butanyls such as butan-1-yl, butan-2-yl (sec-butyl), 2-methyl-propan-1-yl (isobutyl), 2-methyl-propan-2-yl (t-butyl), cyclobutan-1-yl, etc.; and the like.

"Alkylene" refers to a branched or unbranched saturated hydrocarbon chain, usually having from 1 to 40 carbon atoms, more usually 1 to 10 carbon atoms and even more usually 1 to 6 carbon atoms. This term is exemplified by groups such as methylene (—$CH_2$—), ethylene (—$CH_2CH_2$—), the propylene isomers (e.g., —$CH_2CH_2CH_2$— and —$CH(CH_3)CH_2$—) and the like.

"Alkenyl" by itself or as part of another substituent refers to an unsaturated branched, straight-chain or cyclic alkyl radical having at least one carbon-carbon double bond derived by the removal of one hydrogen atom from a single carbon atom of an alkene. The group may be in either the cis or trans conformation about the double bond(s). Typical alkenyl groups include, but are not limited to, ethenyl; propenyls such as prop-1-en-1-yl, prop-1-en-2-yl, prop-2-en-1-yl (allyl), prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, etc.; and the like.

"Alkynyl" by itself or as part of another substituent refers to an unsaturated branched, straight-chain or cyclic alkyl radical having at least one carbon-carbon triple bond derived by the removal of one hydrogen atom from a single carbon atom of an alkyne. Typical alkynyl groups include, but are not limited to, ethynyl; propynyls such as prop-1-yn-1-yl, prop-2-yn-1-yl, etc.; butynyls such as but-1-yn-1-yl, but-1-yn-3-yl, but-3-yn-1-yl, etc.; and the like.

"Acyl" by itself or as part of another substituent refers to a radical —$C(O)R^{30}$, where $R^{30}$ is hydrogen, alkyl, cycloalkyl, cycloheteroalkyl, aryl, arylalkyl, heteroalkyl, heteroaryl, heteroarylalkyl as defined herein and substituted versions thereof. Representative examples include, but are not limited to formyl, acetyl, cyclohexylcarbonyl, cyclohexylmethylcarbonyl, benzoyl, benzylcarbonyl, piperonyl, succinyl, and malonyl, and the like.

The term "aminoacyl" refers to the group —$C(O)NR^{21}R^{22}$, wherein $R^{21}$ and $R^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, and substituted heterocyclic and where $R^{21}$ and $R^{22}$ are optionally joined together with the nitrogen bound thereto to form a heterocyclic or substituted heterocyclic group, and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Alkoxy" by itself or as part of another substituent refers to a radical —$OR^{31}$ where $R^{31}$ represents an alkyl or cycloalkyl group as defined herein. Representative examples include, but are not limited to, methoxy, ethoxy, propoxy, butoxy, cyclohexyloxy and the like.

"Alkoxycarbonyl" by itself or as part of another substituent refers to a radical —$C(O)OR^{31}$ where $R^{31}$ represents an alkyl or cycloalkyl group as defined herein. Representative examples include, but are not limited to, methoxycarbonyl, ethoxycarbonyl, propoxycarbonyl, butoxycarbonyl, cyclohexyloxycarbonyl and the like.

"Aryl" by itself or as part of another substituent refers to a monovalent aromatic hydrocarbon radical derived by the removal of one hydrogen atom from a single carbon atom of an aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. In certain embodiments, an aryl group comprises from 6 to 20 carbon atoms. In certain embodiments, an aryl group comprises from 6 to 12 carbon atoms. Examples of an aryl group are phenyl and naphthyl.

"Arylalkyl" by itself or as part of another substituent refers to an acyclic alkyl radical in which one of the hydrogen atoms bonded to a carbon atom, typically a terminal or $sp^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl and/or arylalkynyl is used. In certain embodiments, an arylalkyl group is ($C_7$-$C_{30}$) arylalkyl, e.g., the alkanyl, alkenyl or alkynyl moiety of the arylalkyl group is ($C_1$-$C_{10}$) and the aryl moiety is ($C_6$-$C_{20}$). In certain embodiments, an arylalkyl group is ($C_7$-$C_{20}$) arylalkyl, e.g., the alkanyl, alkenyl or alkynyl moiety of the arylalkyl group is ($C_1$-$C_8$) and the aryl moiety is ($C_6$-$C_{12}$).

"Arylaryl" by itself or as part of another substituent, refers to a monovalent hydrocarbon group derived by the removal of one hydrogen atom from a single carbon atom of a ring system in which two or more identical or non-identical aromatic ring systems are joined directly together by a single bond, where the number of such direct ring junctions is one less than the number of aromatic ring systems involved. Typical arylaryl groups include, but are not limited to, biphenyl, triphenyl, phenyl-napthyl, binaphthyl, biphenyl-napthyl, and the like. When the number of carbon atoms in an arylaryl group are specified, the numbers refer to the carbon atoms comprising each aromatic ring. For example, ($C_5$-$C_{14}$) arylaryl is an arylaryl group in which each aromatic ring comprises from 5 to 14 carbons, e.g., biphenyl, triphenyl, binaphthyl, phenylnapthyl, etc. In certain embodiments, each aromatic ring system of an arylaryl group is independently a ($C_5$-$C_{14}$) aromatic. In certain embodiments, each aromatic ring system of an arylaryl group is independently a ($C_5$-$C_{10}$) aromatic. In certain embodiments, each aromatic ring system is identical, e.g., biphenyl, triphenyl, binaphthyl, trinaphthyl, etc.

"Carboxyl," "carboxy" or "carboxylate" refers to —$CO_2H$ or salts thereof. "Carboxyl ester" or "carboxy ester" or the terms "carboxyalkyl" or "carboxylalkyl" refers to the groups —C(O)O-alkyl, —C(O)O-substituted alkyl, —C(O)O-alkenyl, —C(O)O-substituted alkenyl, —C(O)O-alkynyl, —C(O)O-substituted alkynyl, —C(O)O-aryl, —C(O)O-substituted aryl, —C(O)O-cycloalkyl, —C(O)O-substituted cycloalkyl, —C(O)O-cycloalkenyl, —C(O)O-substituted cycloalkenyl, —C(O)O-heteroaryl, —C(O)O-substituted heteroaryl, —C(O)O-heterocyclic, and —C(O)O-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"(Carboxyl ester)oxy" or "carbonate" refers to the groups —O—C(O)O— alkyl, —O—C(O)O-substituted alkyl, —O—C(O)O-alkenyl, —O—C(O)O-substituted alkenyl, —O—C(O)O-alkynyl, —O—C(O)O-substituted alkynyl, —O—C(O)O-aryl, —O—C(O)O-substituted aryl, —O—C(O)O-cycloalkyl, —O—C(O)O-substituted cycloalkyl, —O—C(O)O-cycloalkenyl, —O—C(O)O— substituted cycloalkenyl, —O—C(O)O-heteroaryl, —O—C(O)O-substituted heteroaryl, —O—C(O)O-heterocyclic, and —O—C(O)O-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Cycloalkyl" by itself or as part of another substituent refers to a saturated or unsaturated cyclic alkyl radical. Where a specific level of saturation is intended, the nomenclature "cycloalkanyl" or "cycloalkenyl" is used. Typical cycloalkyl groups include, but are not limited to, groups derived from cyclopropane, cyclobutane, cyclopentane, cyclohexane and the like. In certain embodiments, the cycloalkyl group is ($C_3$-$C_{10}$) cycloalkyl. In certain embodiments, the cycloalkyl group is ($C_3$-$C_7$) cycloalkyl.

"Cycloheteroalkyl" or "heterocyclyl" by itself or as part of another substituent, refers to a saturated or unsaturated cyclic alkyl radical in which one or more carbon atoms (and any associated hydrogen atoms) are independently replaced with the same or different heteroatom. Typical heteroatoms to replace the carbon atom(s) include, but are not limited to, N, P, O, S, Si, etc. Where a specific level of saturation is intended, the nomenclature "cycloheteroalkanyl" or "cycloheteroalkenyl" is used. Typical cycloheteroalkyl groups include, but are not limited to, groups derived from epoxides, azirines, thiiranes, imidazolidine, morpholine, piperazine, piperidine, pyrazolidine, pyrrolidine, quinuclidine and the like.

"Heteroalkyl, Heteroalkanyl, Heteroalkenyl and Heteroalkynyl" by themselves or as part of another substituent refer to alkyl, alkanyl, alkenyl and alkynyl groups, respectively, in which one or more of the carbon atoms (and any associated hydrogen atoms) are independently replaced with the same or different heteroatomic groups. Typical heteroatomic groups which can be included in these groups include, but are not limited to, —O—, —S—, —S—S—, —O—S—, —$NR^{37}R^{38}$—, =N—N=, —N=N—, —N=N—$NR^{39}R^{40}$, —$PR^{41}$—, —$P(O)_2$—, —$POR^{42}$—, —O—$P(O)_2$—, —S—O—, —S—(O)—, —$SO_2$—, —$SnR^{43}R^{44}$— and the like, where $R^{37}$, $R^{38}$, $R^{39}$, $R^{40}$, $R^{41}$, $R^{42}$, $R^{43}$ and $R^{44}$ are independently hydrogen, alkyl, substituted alkyl, aryl, substituted aryl, arylalkyl, substituted arylalkyl, cycloalkyl, substituted cycloalkyl, cycloheteroalkyl, substituted cycloheteroalkyl, heteroalkyl, substituted heteroalkyl, heteroaryl, substituted heteroaryl, heteroarylalkyl or substituted heteroarylalkyl.

"Heteroarylalkyl" by itself or as part of another substituent, refers to an acyclic alkyl radical in which one of the hydrogen atoms bonded to a carbon atom, typically a terminal or $sp^3$ carbon atom, is replaced with a heteroaryl group. Where specific alkyl moieties are intended, the nomenclature heteroarylalkanyl, heteroarylalkenyl and/or heterorylalkynyl is used. In certain embodiments, the heteroarylalkyl group is a 6-30 membered heteroarylalkyl, e.g., the alkanyl, alkenyl or alkynyl moiety of the heteroarylalkyl is 1-10 membered and the heteroaryl moiety is a 5-20-membered heteroaryl. In certain embodiments, the heteroarylalkyl group is 6-20 membered heteroarylalkyl, e.g., the alkanyl, alkenyl or alkynyl moiety of the heteroarylalkyl is 1-8 membered and the heteroaryl moiety is a 5-12-membered heteroaryl.

DETAILED DESCRIPTION

Aspects of the invention include color change compositions having a color former and color developer composition that transitions from a first color state to a second color state upon application of an applied stimulus and an amount of a copolymer sufficient to eliminate background color of the color former and color developer composition during transition from the first color state to the second color state. Methods for preparing and devices employing the color change compositions of the invention are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As reviewed above, the present invention provides color change compositions having a color former and color developer composition and a copolymer, as well as methods for preparing and devices employing the color change compositions of the invention. In further describing embodiments of the invention, color change compositions are first reviewed in greater detail. Next, methods for preparing the subject compositions are described. Devices employing the color change compositions are also described.

Color Change Compositions

As summarized above, the subject invention provides color change compositions having a color former and color developer composition that transitions from a first color state to a second color state upon application of an applied stimulus and an amount of a copolymer sufficient to eliminate background color of the color former and color developer composition during transition from the first color state to the second color state. By "eliminate background color" is meant that the copolymer is present in an amount where the initial color of the color change composition is reduced or altogether removed after the color change composition has transitioned to the second color. In other words, when the copolymer is present in the subject compositions, the color change composition retains 5% or less of the initial color in the composition as determined by visual inspection (e.g., by the human eye or a computer employing an optical detector device), such as 3% or less of the initial color, such as 1% or less of the initial color, such as 0.5% or less of the initial color, such as 0.1% or less the initial color and including retaining 0.01% or less of the initial color in the composition. In certain embodiments, the amount of copolymer present in the subject composition is sufficient completely remove all of the residual background color such that the color change composition retains none of the initial color of the composition as determined by visual inspection.

For example, in some embodiments where the first color state of the color change composition is red and the second color state is green, an amount of the copolymer is present in compositions of interest that is sufficient to reduce or altogether remove any residual red color in the composition after the color change composition has transitioned to the green color state. In these embodiments, the color change composition retains 5% or less of the red color after transitioning to the green color state, such as 3% or less of the red color, such as 1% or less of the red color, such as 0.5% or less of the red color, such as 0.1% or less the red color and including retaining 0.01% or less of the red color in the composition after the color change composition has transitioned to the green color state.

In embodiments of the invention, compositions of interest change color upon application of an applied stimulus. Stimuli sufficient for inducing a color change transition may be a variety of different types of physicochemical stimuli, depending on device employing the subject compositions, as described in greater detail below. As such, the applied stimulus (i.e., color change triggering processes) may include but is not limited to light, mechanical perturbation, changes in temperature, change in pH, chemical exposure, biochemical exposure, ionization, state of hydration, state of solvation, hydrogen bonding, protonation. Thus, color change compositions may be photochromic, mechanochromic, thermochromic, solvatochromic, hydrochromic or halochromic compositions, among other color change compositions.

Copolymer Compounds

As reviewed above, color change compositions of the present invention include an amount of a copolymer sufficient to eliminate background color of the color former and color developer composition during transition from the first color state to the second color state. In embodiments of the invention, copolymers of interest include the class of polymeric compounds described by the formula:

Formula (I)

where n is an integer from 10 to 1000, m is an integer from 10 to 1000 and R is alkyl, substituted alkyl, alkenyl, substituted alkenyl, alkynyl, substituted alkynyl, acyl, substituted acyl, acyloxy, substituted acyloxy, alkoxycarbonyl, substituted alkoxycarbonyl, carboxyl or substituted carboxyl.

In certain embodiments, R is an acyloxy group or substituted acyloxy group. The term "acyloxy" is used in its conventional sense to refer to substituents having the general structure $-C(O)OR^1$, where $R^1$ is hydrogen, alkyl, cycloalkyl, cycloheteroalkyl, aryl, arylalkyl, heteroalkyl, heteroaryl, heteroarylalkyl.

Where R is an acyloxy group or a substituted acyloxy group, in certain instances, the copolymer is a polymer having formula (II):

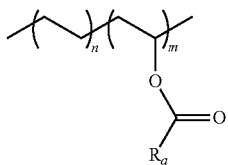

Formula (II)

where n is an integer from 10 to 1000; m is an integer from 10 to 1000; and $R_a$ is hydrogen, alkyl or substituted alkyl. In some embodiments, $R_a$ is a C1-C12 alkyl or a C1-C12 substituted alkyl. Where $R_a$ is a C1-C12 alkyl, in certain instances $R_a$ is a C1-C6 alkyl such as methyl or ethyl. In some embodiments, $R_a$ is methyl. In other embodiments, $R_a$ is ethyl. In certain embodiments, the copolymer of formula (II) is ethyl vinyl acetate.

In certain embodiments, R is an alkoxycarbonyl group or substituted alkoxycarbonyl group. Where R is an alkoxycarbonyl group or substituted alkoxycarbonyl group, in certain instances, the copolymer is a polymer having formula (III):

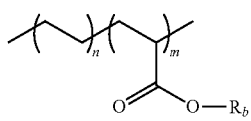

Formula (III)

where n is an integer from 10 to 1000; m is an integer from 10 to 1000; and $R_b$ is hydrogen, alkyl or substituted alkyl. In some embodiments $R_b$ is a C1-C12 alkyl or a C1-C12 substituted alkyl. Where $R_b$ is a C1-C12 alkyl, in certain instances $R_b$ is a C1-C6 alkyl such as methyl or ethyl. In some embodiments, $R_b$ is methyl. In other embodiments, $R_b$ is ethyl. In other embodiments, $R_b$ is propyl. In yet other embodiments, $R_b$ is butyl. In certain embodiments, the copolymer of formula (III) is selected from ethylene methyl acrylate, ethylene ethyl acrylate and ethylene butyl acrylate.

The size of the copolymer may vary, where n ranges from 10 to 1000, such as 25 to 900, such as 50 to 800, such as 75 to 750, such as 100 to 500, such as 150 to 400 and including where n ranges from 200 to 300. Likewise, the size of the copolymer may vary where m ranges from 10 to 1000, such as 25 to 900, such as 50 to 800, such as 75 to 750, such as 100 to 500, such as 150 to 400 and including where n ranges from 200 to 300. As such, the molecular weight of the subject copolymers may be 1 kDa or greater, such as 10 kDa or greater, such as 15 kDa or greater, such as 25 kDa or greater, such as 40 kDa or greater, such as 50 kDa or greater, such as 60 kDa or greater, such as 75 kDa or greater and including 100 kDa or greater.

The ratio of n and m in copolymers of interest may vary depending on the desired properties of the copolymer in the subject color change compositions. For example, the ratio of n and m may range between 1:1 and 1:10, such as between 1:1 and 1:9, such as between 1:1 and 1:8, such as between 1:1 and 1:7, such as between 1:1 and 1:6, such as between 1:1 and 1:5, such as between 1:1 and 1:4, such as between 1:1 and 1:3 and including between 1:1 and 1:2. In other embodiments, the ratio of n and m may range between 1:1 and 10:1, such as between 1:1 and 9:1, such as between 1:1 and 8:1, such as between 1:1 and 7:1, such as between 1:1 and 6:1, such as between 1:1 and 5:1, such as between 1:1 and 4:1, such as between 1:1 and 3:1 and including between 1:1 and 2:1.

The amount of copolymer in color change compositions of the invention may vary depending on the particular color former and color developer compositions, method of color change, the initial and final colors in the color transition from the first color state to second color state, ranging from 0.01% to 15% w/w, such as 0.05% to 14% w/w, such as 0.1% to 13% w/w, such as 0.5% to 12% w/w, such as 0.75% to 11% w/w, such as 1% to 10% w/w, such as 1.5% to 8.5% w/w, such as 2.5% to 7.5% w/w and including 3% to 6% w/w. Any convenient amount from 0.01% to 15% w/w may be employed in the subject compositions so long as the amount is sufficient to eliminate background color by reducing or altogether removing any residual color from the initial color state after the composition has transitioned to the second color state as determined by visual inspection.

The mass ratio of the copolymer to color former and color developer composition may vary, in some embodiments ranging between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5, or a range thereof. For instance, the mass ratio of copolymer to color former and color developer composition may range between 1:1 and 1:5, such as 1:1 and 1:4.5, such as 1:1 and 1:4, such as 1:1 and 1:3.5, such as 1:1 and 1:3, such as 1:1 and 1:2.5, such as 1:1 and 1:2, including 1:1 and 1:1.5. In other embodiments, the mass ratio of color former and color developer composition to copolymer may range between 1:1 and 1:2; 1:1 and 1:3; 1:1 and 1:4; or 1:1 and 1:5. For instance, the mass ratio of color former and color developer composition to copolymer may range between 1:1 and 1:5, such as 1:1 and 1:4.5, such as 1:1 and 1:4, such as 1:1 and 1:3.5, such as 1:1 and 1:3, such as 1:1 and 1:2.5, such as 1:1 and 1:2, including 1:1 and 1:1.5.

Color Former and Color Developer Compositions

As reviewed above, color change compositions of the present invention include a composition having a color former and a color developer that transitions from a first color state to a second color state upon application of an applied stimulus. In embodiments of the invention, the transition from a first color state to a second color state upon application of an applied stimulus may be one or more of: 1) a transition from a colorless state to a colored state; 2) a transition from a colored state to a colorless state; 3) a transition from a transparent state to a translucent or opaque state; 4) a transition from a translucent or opaque state to a transparent state; 5) a transition from a glossy state to a matte state; 6) a transition from a matte state to a glossy state; 7) a transition from a first color to a second, different color. In certain embodiments, the color change composition transitions from a colorless state to a colored state under the applied stimulus. In other embodiments, the color change composition transitions from a colored state to a colorless state under the applied stimulus. In yet other embodiments, the color change composition transitions from a first color to a second, different color under the applied stimulus.

As described in greater detail below, the stimulus for inducing the subject color change transitions may vary depending on the type of color change composition desired. For example the physicochemical stimuli (i.e., color change triggering processes) may include but is not limited to light, mechanical perturbation, changes in temperature, change in pH, chemical exposure, biochemical exposure, ionization, state of hydration, state of solvation, hydrogen bonding, protonation. Thus, color change compositions may be photochromic, mechanochromic, thermochromic, solvatochromic hydrochromic and halochromic compositions, among other color change compositions. In certain embodiments, the subject color change compositions are thermochromic compositions where the applied stimulus sufficient for transition from a first color state to a second color state is a change in temperature (e.g., heat or cooling). In other embodiments, the subject color change compositions are halochromic compositions where the applied stimulus is a change in the pH.

The color transitions may be irreversible or reversible. In some embodiments, the color transitions are irreversible, i.e., the color change composition transitions from a first color state to a second color state and remains in the second color state for the remaining lifetime of the color change composition.

Alternatively, the color state may be reversible, i.e., the color change composition is capable of transition back from the second color state to the first color state after initial chromic transition. Depending on the color change composition desired, reversible color change compositions of the interest may be capable of transitioning from a first color state to a second color state or from the second color state back to the first color state any suitable number of times. For example, the color change composition may be capable of 5 color transitions or more, such as 10 color transitions or more, such as 25 color transitions or more, such as 50 color transitions or more, such as 100 color transitions or more, such as 250 color transitions or more, such as 500 color transitions or more and including 1000 color transitions or more. Either reversible or irreversible color formers can be employed depending on the desired embodiment of interest. For instance, reversible color formers can be employed where it is desirable to have a multi-use effect or reuse the color change effect. In these embodiments, it may be desirable to utilize a reversible thermochromic color former which is capable of 5 color transitions or more, such as 25 color transitions or more and including 1000 color transitions or more. In other instances, it may be desirable to record a single permanent color change. In these embodiments, an irreversible color former which changes color only a single time may be employed. For example, disposable indicator compositions may employ a color former having an irreversible chromic transition.

In embodiments of the invention, the term "color former" is used herein to refer to the component of the color change composition which exhibits the visible transition from the first color state to the second color state. Depending on the type of physicochemical stimuli, the type of color former compound may vary. For example, the color former may be a photochromic compound, a mechanochromic compound, a thermochromic compound, a solvatochromic compound, a hydrochromic compound or a halochromic compound, among other color change compositions. As such, the color former may exhibit a visible transition from a first color state to a second color state in response to light, mechanical perturbation, changes in temperature, change in pH, chemical exposure, biochemical exposure, ionization, a change in state of hydration, a change in state of solvation, hydrogen bonding or protonation. For example, photochromic, mechanochromic, thermochromic, solvatochromic, hydrochromic and halochromic color transitions may include those as described in U.S. patent application Ser. No. 13/572,526, the disclosure of which is herein incorporated by reference In certain embodiments, the color former is a thermochromic compound. The term "thermochromic" is used in its conventional sense to refer to a compound which changes color state in response to a change in temperature (i.e., heating or cooling). Depending on the desired color change composition, temperature transitions of color formers of interest may vary widely, and may be at about −25° C. or higher, such as at about −15° C. or higher, such as at about −5° C. or higher, such as at about 0° C. or higher, such as at about 5° C. or higher, such as at about 10° C. or higher, such as at about 20° C. or higher, such as at about 25° C. or higher, such as at about 35° C. or higher, such as at about 50° C. or higher, such as at about 75° C. or higher, such as at about 90° C. or higher, such as at about 100° C. or higher, such as at about 110° C. or higher and including at about 125° C. or higher. In certain embodiments, the temperature transitions occur in a range of temperatures, such as a range between −25° C. to 125° C., such as a range between −15° C. to 115° C., such as a range between −5° C. to 105° C., such as a range between 0° C. to 100° C., such as a range between 10° C. to 90° C., such as a range between 20° C. to 80° C., such as a range between 30° C. to 70° C. and including a range between 40° C. to 60° C.

Example thermochromic dyes of interest as color formers in the subject color change compositions may include but are not limited to bis(2-amino-4-oxo-6-methylpyrimidinium)-tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium) tetrachlorocuprate(II) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the photoproduct 7,7adihydro-4,7,7,7a-tetramethyl-2-phenylbenzo[b]thiophene-5,6-dicarboxylic anhydride, micro-encapsulated dyes, precise melting point compositions, infra-red dyes, spirobenzopyrans, spironnapthooxazines, spirothopyran and related compounds, leuco quinone dyes, natural leuco quinone, traditional leuco quinone, synthetic quinones, thiazine leuco dyes, acylated leuco thiazine dyes, nonacylated leuco thiazine dyes, oxazine leuco dyes, acylated oxazine dyes, nonacylated oxazine leuco dyes, catalytic dyes, combinations with dye developers, arylmethane phthalides, diarylmethane phthalides, monoarylmethane phthalides, monoheterocyclic substituted phthalides, 3-hetercyclic substituted phthalides, diarylmethylazaphthalides, bishetercyclic substituted phthalides, 3,3-bisheterocyclic substituted phthalides, 3-heterocyclic substituted azaphthalides, 3,3-bisheterocyclic substituted azaphthalides, alkenyl substituted phthalides, 3-ethylenyl phthalides, 3,3-bisethylenyl phthalides, 3-butadienyl phthalides, bridged phthalides, spirofluorene phthalides, spirobensanthracene phthalides, bisphthalides, di and triarylmethanes, diphenylmethanes, carbinol bases, pressure sensitive recrcording chemistries, photosensitive recording chemistries, fluoran compounds, reaction of keto acids and phenols, reactions of keto acids with 4-alkoxydiphenylamines, reactions of keto acids sith 3-alkoxdiphenylamines, reactions of 2'-aminofluorans with aralkyl halides, reaction of 3'-chlorofluorans with amines, thermally sensitive recording mediums, tetrazolium salts, tetrazolium salts from formazans, tetrazolium salts from tetrazoles, and the like. Additional thermochromic compounds of interest may include, but are not limited to: light-induced metastable state in a thermochromic copper (II) complex (see e.g., *Chem. Commun.*, 2002, (15), 1578-1579) which under goes a color change from red to purple for a thermochromic complex, [Cu(dieten)2](BF4)2 (dieten=N,N-diethylethylenediamine); bis(2-amino-4-oxo-6-methyl-pyrimidinium)-tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium)-tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium) tetrachlorocuprate(II) and bis(2-amino-4-chloro-6-methylpyrimidinium) hexachlorodicuprate(II), benzo- and naphthopyrans (chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the photoproduct 7,7adihydro-4,7,7,7a-tetramethyl-2-phenylbenzo[b]thiophene-5,6-dicarboxylic anhydride, and the like.

In certain embodiments, the color former is a leuco dye, including compounds exhibiting colored to colorless transitions, colorless to colored transitions or a transition from a first color to a second, different color. Leuco dyes of interest may include, but are not limited to vinylphenylmethane-leucocyanides and derivatives, fluoran dyes and derivatives, thermochromic pigments, micro and nano-pigments, molybdenum compounds, doped or undoped vanadium dioxide, indolinospirochromenes, melting waxes, encapsulated dyes, liquid crystalline materials, cholesteric liquid crystalline materials, spiropyrans, polybithiophenes, bipyridine materials, microencapsulated, mercury chloride dyes, tin complexes and combination thermochromic/photochromic materials. The type of color former compound may vary depending on the desired color change composition, associated costs, amount added, type of color change desired, level of color contrast, levels or color hue change, reversibility or irreversibility, stability, among other factors.

In some embodiments, color former compounds include diacetylenic polydiacetylene polymers, including but not limited to 2,3-dihydroxypropyl-10,12-dodecadiynoate (2,3-DHP-10,12-C12); 2,3-DHP-10,12-C13; 2,3-DHP-10,12-C14; 2,3-DHP-10,12-C15; 2,3-DHP-10,12-C16; 2,3-DHP-10,12-C17; 2,3-DHP-10,12-C18; 2,3-DHP-10,12-C19; 2,3-DHP-10,12-C20; 2,3-DHP-10,12-C21; 2,3-DHP-10,12-C22; 2,3-DHP-10,12-C23; 2,3-DHP-10,12-C24; 2,3-DHP-10,12-C25; 2,3-DHP-10,12-C26; 2,3-DHP-10,12-C27; 2,3-DHP-10,12-C28; 2,3-DHP-10,12-C29 and 2,3-DHP-10,12-C30 among other diacetylenic compounds.

In certain embodiments, diacetylenic color former compounds of the invention include those described in U.S. patent application Ser. No. 12/643,887, the disclosure of which is herein incorporated by reference.

The color change exhibited by the color former may be any desired chromic transition. For example, colored to colorless transitions may include, but are not limited to: yellow to colorless, orange to colorless, red to colorless, pink to colorless, magenta to colorless, purple to colorless, blue to colorless, turquoise to colorless, green to colorless, brown to colorless and black to colorless among other colored to colorless transitions. Colorless to colored transitions may include, but are not limited to: colorless to yellow, colorless to orange, colorless to red, colorless to pink, colorless to magenta, colorless to purple, colorless to blue, colorless to turquoise, colorless to green, colorless to brown and colorless to black, among other colorless to colored transitions. In some embodiments, the chromic transition is a change from a first color to a second, different color. For example, color to color transitions may include, but are not limited to: orange to yellow, orange to pink, orange to very light green, orange to peach; red to yellow, red to orange, red to pink, red to light green, red to peach; magenta to yellow, magenta to orange, magenta to pink, magenta to light green, magenta to light blue; purple to red, purple to pink, purple to blue; blue to pink; blue to light green, dark blue to light yellow, dark blue to light green, dark blue to light blue; turquoise to light green, turquoise to light blue, turquoise to light yellow, turquoise to light peach, turquoise to light pink; green to yellow, dark green to orange, dark green to light green, dark green to light pink; brown and black to a variety of assorted colors, among other color to color transitions.

In certain embodiments, the chromic transition is a change from red to green. In other embodiments, the chromic transition is a change from green to red. Where the chromic transition is a change from red to green or a change from green to red, in certain embodiments, two different leuco dyes are mixed together to achieve the chromic transition. In these embodiments, one leuco dye may be a colored to colorless dye and a second leuco dye may be a colorless to colored dye where the first leuco dye and the second leuco dye undergo chromic transition in response to the same applied stimulus (e.g., heat, cooling). In combination, the two different leuco dyes are capable of forming chromic transitions previously unattainable by chromic change compositions. In addition, the resulting combination of color to colorless and colorless to color in different combinations permits the possibility of heretofore not realized color overlap such that stationary colors do not interfere with the initial or final color.

The amount of color former in compositions of the invention may vary depending on the particular color former and color developer compositions, stimulus of color change, type of chromic transition, where in some embodiments the amount ranges from 1% to 30% w/w, such as 2% to 28% w/w, such as 3% to 25% w/w, such as 4% to 23% w/w, such as 5% to 22% w/w, such as 7% to 20% w/w, such as 8% to 18% w/w, such as 9% to 17% w/w and including 10% to 15% w/w.

Color former and color developer compositions of interest further include a color developer. In embodiments of the invention, the term "color developer" is used to refer to the component of the color change composition which facilitates chromic transitions in the color former compound. In certain instances, the color developer compound may undergo a phase transition upon exposure to the applied stimulus, where the phase transition is sufficient to initiate the chromic transition of the color former. For example, the phase transition may be a transition from solid to liquid, a transition from liquid to solid, a transition from liquid to gas, a transition from gas to liquid, a transition from solid to gas or a transition from gas to liquid. In certain embodiments, the phase transition is a transition from liquid to solid or a transition from solid to liquid.

Compositions according to certain embodiments include single component color developers. By single component color developer is meant that the color developer consists of only one compound. As such, where the color developer is a single compound, no additional compounds are present in the color former and color developer composition other than the one or more color former compounds (which provides the chromic transition) and the color developer compound. In these embodiments, the color developer functions as both the solvent and color developer components of the color former and color developer composition. In some instances, single component developers assist in controlling the chromic transition by its ability to anneal or un-anneal depending on the particular phase transition to create or to abandon a charge transfer complexes through phase dissociation and association processes.

Color developer compounds of interest include, but are not limited to glycerol monostearate derivatives, low acidic phase associating compounds, mild protonating phase associating compounds, and the like. In some embodiments, color developer compounds may be esterified, hydroxyl containing compounds. For example, glycerol monostearate derivatives may include, but are not limited to: 2,3-dihydroxypropyl C5; 2,3-dihydroxypropyl C7; 2,3-dihydroxypropyl C8; 2,3-dihydroxypropyl C9; 2,3-dihydroxypropyl C10; 2,3-dihydroxypropyl C11; 2,3-dihydroxypropyl C12; 2,3-dihydroxypropyl C13; 2,3-dihydroxypropyl C14; 2,3-dihydroxypropyl C15; 2,3-dihydroxypropyl C16; 2,3-dihydroxypropyl C17; 2,3-dihydroxypropyl C18; 2,3-dihydroxypropyl C19; 2,3-dihydroxypropyl C20; 2,3-dihydroxypropyl C21; 2,3-dihydroxypropyl C22; 2,3-dihydroxypropyl C23; 2,3-dihydroxypropyl C24; 2,3-dihydroxypropyl C25; 2,3-dihydroxypropyl C26; 2,3-dihydroxypropyl C27; 2,3-dihydroxypropyl C28; 2,3-dihydroxypropyl C29; 2,3-dihydroxypropyl C30; 3,4-dihydroxybutyl C5; 3,4-dihydroxybutyl C6; 3,4-dihydroxybutyl C7; 3,4-dihydroxybutyl C8; 3,4-dihydroxybutyl C9; 3,4-dihydroxybutyl C11; 3,4-dihydroxybutyl C12; 3,4-dihydroxybutyl C13; 3,4-dihydroxybutyl C14; 3,4-dihydroxybutyl C15; 3,4-dihydroxybutyl C16; 3,4-dihydroxybutyl C17; 3,4-dihydroxybutyl C18; 3,4-dihydroxybutyl C19; 3,4-dihydroxybutyl C20; 3,4-dihydroxybutyl C21; 3,4-dihydroxybutyl C22; 3,4-dihydroxybutyl C23; 3,4-dihydroxybutyl C24; 3,4-dihydroxybutyl C25; 3,4-dihydroxybutyl C26; 3,4-dihydroxybutyl C27; 3,4-dihydroxybutyl C28; 3,4-dihydroxybutyl C29 and 3,4-dihydroxybutyl C30, among other glycerol monostearate derivatives.

In some embodiments, color developer compounds include diacetylenic polydiacetylene polymers, including but not limited to 2,3-dihydroxypropyl-10,12-dodecadiynoate (2,3-DHP-10,12-C12); 2,3-DHP-10,12-C13; 2,3-DHP-10,12-C14; 2,3-DHP-10,12-C15; 2,3-DHP-10,12-C16; 2,3-DHP-10,12-C17; 2,3-DHP-10,12-C18; 2,3-DHP-10,12-C19; 2,3-DHP-10,12-C20; 2,3-DHP-10,12-C21; 2,3-DHP-10,12-C22; 2,3-DHP-10,12-C23; 2,3-DHP-10,12-C24; 2,3-DHP-10,12-C25; 2,3-DHP-10,12-C26; 2,3-DHP-10,12-C27; 2,3-DHP-10,12-C28; 2,3-DHP-10,12-C29 and 2,3-DHP-10,12-C30 among other diacetylenic compounds.

In certain embodiments, the color former and the color developer are both diacetylenic compounds, such as for example polydiacetylene polymers. Where both the color former and color developer are both diacetylenic compounds, in some instances the color former and color developer are the same diacetylenic compound. In other embodiments, the color former and the color developer are different diacetylenic compounds. In certain instances, the color former compound and the color developer compound are co-topo-polymeric diacetylenic compounds composed of two different co-crystallized diacetylenic monomers. Example co-topo-polymeric diacetylenic compositions of interest include those described in U.S. Pat. No. 8,187,892, the disclosure of which is herein incorporated by reference in its entirety.

In other embodiments, color developer compounds may include ester containing compounds having a hydroxylated esterifying group. Example ester containing color developer compounds include, but are not limited to n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl icosanoate, n-undecyl icosanoate, n-tridecyl icosanoate, n-pentadecyl icosanoate, n-nonyl behenate, n-undecyl behenate, n-tridecyl behenate, and n-pentadecyl behenate among other ester containing compounds.

In yet other embodiments, color developer compounds may be tert-butylphenol, nonylphenol, dodecyl phenol, styrenated phenols, 2,2-methylene-bis-(4-methyl-6-tert-butyl-phenol), .alpha.-naphthol, .beta.-naphthol, hydroquinemonomethyl-ether, guaiacol, eugenol, p-chlorophenol, p-bromophenol, o-chlorophenol, o-bromophenol, o-phenyl phenol, p-phenyl phenol, p-(p-chlorophenyl)-phenol, o-(o-chlorophenyl)-phenol, p-methyl hydroxy benzoate, p-ethyl hydroxy benzoate, p-octyl hydroxy benzoate, p-butyl hydroxy benzoate, p-octyl hydroxy benzoate, p-dodecyl hydroxy benzoate, 3-iso-propyl catechol, p-tert-butyl catechol, 4,4-methylene diphenol, 4,4-chio-bis-(6-tert-butyl-3-methylphenol), 1,1-bis-(4-hydroxyphenol)-cyclohexane, 4,4-butylidene-bis-(6-tert-butyl-3-methylphenol, bisphenol A, bisphenol S, 1,2-dioxynaphtaleine, 2,3-dioxynaphthalein, chlorocatechol, bromo catechol, 2,4-dihydroxybenzophenon, pheno phtalein, o-cresol phthalein, methyl protocatechinate, ethyl protocatechinate, propyl protocatechinate, octyl protocatechinate, dodecyl protocatechinate, 2,4,6-trioxymethyl benzene, 2,3,4-trioxyethyl benzene, methyl gallicate, ethyl gallicate, propyl gallicate, butyl gallicate, hexyl gallicate, octyl gallicate, dodecyl gallicate, cetyl gallicate, stearyl gallicate, 2,3,5-trioxynaphthalein, tannin acid and phenol resins.

In yet other embodiments, the color developer may be a polymer. In some instances, the polymer is a polyacrylic acid or a polyacrylic acid ester. A variety of small to large molecular weight polyacrylic acids (PAA) can be utilized. The molecular weight, degree of polymerization, mobility, proton donating characteristics, adhesive binding characteristics, melting point characteristics, phase transition, density, molecular weight cutoff, degree of chemical modification and associated binding resin of a polymeric color developer compound can be adjusted as desired to precisely fit the specifically paired color former, stimulus of color change as well as type of chromic transition and temperature of color change.

Acrylic acid monomers, oligomers, low molecular weight polymers, medium molecular weight polymers, and high molecular weight polymers may be of interest. Depending on the properties of the developer desired, the acrylic acid monomers, oligomers or polymers may range be 0.05 kDa or greater, such as 0.1 kDa or greater, such as 1 kDa or greater, such as 5 kDa or greater, such as 10 kDa or greater, such as 25 kDa or greater, such as 50 kDa or greater, such as 100 kDa or greater, such as 500 kDa or greater, such as 1000 kDa or greater, such as 5000 kDa or greater, such as 10,000 kDa or greater, such as 25,000 kDa or greater and including 50,000 kDa or greeter.

In yet other embodiments, the color developer is a natural food grade compound. For example, the natural food-grade color developer may be carnauba wax. Carnauba wax contains mainly esters of fatty acids (80-85%), fatty alcohols (10-16%), acids (3-6%) and hydrocarbons (1-3%). Specific for carnauba wax is the content of esterified fatty diols (about 20%), hydroxylated fatty acids (about 6%) and cinnamic acid (about 10%). Cinnamic acid, an antioxidant, may be hydroxylated or methoxylated.

In certain embodiments, color developer compounds of the invention include glycerol monostearate derivatives, polydiacetylenic compounds and polymeric compositions as described in U.S. patent application Ser. No. 12/643,887, the disclosure of which is herein incorporated by reference.

The amount of color developer in compositions of the invention may vary depending on the particular color former and color developer compositions, type of color developer (e.g., glycerol monostearate, carnauba wax, etc.) stimulus of color change, type of chromic transition, where in some embodiments the amount ranges from 0.1% to 99% w/w, such as 0.5% to 95% w/w, such as 1% to 90% w/w, such as 5% to 85% w/w, such as 10% to 80% w/w, such as 15% to 75% w/w, such as 20% to 70% w/w, such as 25% to 65% w/w and including 30% to 60% w/w.

The mass ratio of the color former to color developer in the subject compositions may vary, in some embodiments ranging between 1:1 and 1:100, such as between 1:1 and 1:95, such as between 1:1 and 1:90, such as between 1:1 and 1:85, such as between 1:1 and 1:80, such as between 1:1 and 1:75, such as between 1:1 and 1:50, such as between 1:1 and 1:25, such as between 1:1 and 1:10 and including between 1:1 and 1:5 or a range thereof. For instance, the mass ratio of copolymer to color former and color developer composition may range between 1:1 and 1:25, such as between 1:1 and 1:20, such as between 1:1 and 1:15, such as between 1:1 and 1:10 and including between 1:1 and 1:5.

In some embodiments, one or more of the components of the subject compositions may be microencapsulated. The term "microencapsulated" is used in its conventional sense to refer to surrounding or enveloping one or more compounds within a capsule of another compound, yielding microcapsules having diameters that range from less than one micron to several hundred microns in size. For example, microcapsules provided by the invention may have diameters ranging from 1 μm to 1000 μm, such as 5 μm to 900 μm, such as 10 μm to 800 μm, such as 25 μm to 750 μm and including 50 μm to 500 μm. Microcapsules may include a homogeneous mixture of the one or more compounds within the microcapsule or may have a plurality of distinct droplets of each compound.

In embodiments of the invention, one or more of the color former and color developer can be microencapsulated. For example, the color former alone may be encapsulated or the color developer alone may be encapsulated. Alternatively, both the color former and color developer may be both encapsulated within the same microcapsule. Even still, each of the color former and color developer may be individually microencapsulated. Additives (e.g., antioxidants, binding agents, solvents, etc.) to the subject compositions, as described in greater detail below, may also be microencapsulated, as desired.

Microencapsulation may be achieved by any suitable technique depending on the application of interest. Compositions may be microencapsulated with the intention that the core material be confined within capsule walls for a predetermined period of time. Alternatively, core materials may be encapsulated so that the core material will be released either gradually through the capsule walls through controlled release or diffusion, or when external conditions (e.g., heat, acid, light, etc.) trigger the capsule walls to rupture, melt, or dissolve.

Microencapsulation can be achieved by chemical processes and mechanical or physical processes including, but not limited to bulk fluid processes, phase separation processes, chemical processes, mechanical shear processes and milling processes. Compositions discussed herein can be microencapsulated using coacervation, interfacial polymerization, polymer-polymer incompatibility, phase separation processes, oil-in-water encapsulation, centrifugal processes, high-shear processes, mechanical drying processes, fluid bed coating, Wusrster processes, centrifugal extrusion, ultrasonication/coating, rotational suspension, double wall micro-encapsulation, chemical silanization processes, liposomal encapsulation, in-line printing/layering processes, heat/chilling cycling, embedding, in-situ polymerization, urea-formaldehyde systems, melamine formaldehyde systems, impregnation, particle coating, and a variety of other micro-particle formation/microencapsulation processes or the like.

Complex coacervation may be employed to microencapsulate any of the compositions described herein. In the subject coacervation process gelatin having a high isoelectric point and gum arabic containing many carboxyl groups are added to a core-containing suspension at relatively low pH above 35° C. The gelatin and gum Arabic react to form microdroplets of polymer coacervate which separate. The wall can be subsequently hardened by several means such as by the addition of formaldehyde or glutaraldehyde. In the final steps, the suspension of microcapsules is cooled and the pH raised after which the suspension is filtered leaving the microcapsules on the filter media.

Additional Components

Depending on the particular color former and color developer compositions, stimulus of color change, type of chromic transition, compositions of the invention may further include one or more additives. Additives may be added to modify one or more characteristics of the chromic transition (e.g., rate of transition, temperature to initiate color change) or may be added to modify a physical property of the composition (e.g., viscosity, tackiness, etc.).

In some embodiments, the color former and color developer composition further includes a solvent. Of interest are solvents that do not block the chromic transitions facilitated by the color developer or alternatively provides for the raising or lowering of the temperature transition of a particular color change composition. Non-interfering solvents of interest may include mineral oils, low temperature waxes, chloroform, methylethyl ketone, alkyl alcohols, branched or non-branched hydrocarbons such as for example n-Decane; n-Decene; n-Dodecane; n-Dodecene; n-Tetradecane; n-Tetradecene; n-Hexadecane; n-Hexadecene; n-Octadecane; n-Octadecene; n-Eicosane; n-Eicosene and parrifin blend.

In certain embodiments, the solvent is a long-chain hydrocarbon. Depending on the color former and color developer, long-chain hydrocarbon can include, but are not limited to hydrocarbons having chain lengths of C10, C11, C12, C13, C14, C15, C16, C18, C19, C20, C21, C22, C23, C24, C25, C26, C27, C28, C29, C30 and longer synthetic and/or naturally derived hydrocarbon chain lengths.

In certain embodiments, the solvent is a microcrystalline wax, paraffin base or long chain alcohol for dispersion (or as a carrier) of the color former compound, such as for example those described in U.S. patent application Ser. No. 12/643, 887, the disclosure of which is herein incorporated by reference in its entirety.

When present, the amount of solvent in compositions of the invention may vary depending on the particular color former and color developer compositions, stimulus of color change, type of chromic transition, where in some embodiments the amount ranges from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

In some embodiments, the solvent is a component which promotes temperature hysteresis. Solvents which provide temperature hysteresis for compositions of the invention may include, but are not limited to stearyl 2-methylbenzoate, cetyl 4-tert-butylbenzoate, behenyl 4-cyclohexylbenzoate, myristyl 4-phenylbenzoate, lauryl 4-octylbenzoate, hexyl 3,5-dimethylbenzoate, stearyl 3-ethylbenzoate, butyl 4-benzylbenzoate, octyl 3-methyl-5-chlorobenzoate, decyl 4-isopropylbenzoate, stearyl 4-benzoylbenzoate, stearyl 1-naphthoate, cetyl phenylacetate, stearyl phenylacetate, phenyl 4-tert-butylbenzoate, 4-chlorobenzyl 2-methyl benzoate, stearyl 4-chlorobenzoate, myristyl 3-bromobenzoate, stearyl 2-chloro-4-bromobenzoate, decyl 3,4-dichlorobenzoate, octyl 2,4-dibromobenzoate, cetyl 3-nitrobenzoate, cyclohexyl 4-aminobenzoate, cyclohexylmethyl 4-amino benzoate, cetyl 4-diethyklaminobenzoate, stearyl 4-aminobenzoate, decyl 4-methoxybenzoate, cetyl 4-methoxybenzoate, stearyl 4-methoxybenzoate, octyl 4-butoxybenzoate, cetyl 4-butoxybenzoate, 4-methoxybenzyl benzoate, cetyl p-chlorophenylacetate, stearyl p-chlorophenylacetate, decyl 3-benzoylpropionate, cyclohexyl 2-benzoylpropionate, myristyl benzoate, cetyl benzoate, stearyl benzoate, 4-chlorobenzyl benzoate, benzyl cinnamate, cyclohexylmethyl cinnamate, benzyl caproate, 4-chlorobenzyl caprate, 4-methoxybenzyl myristate, 4-methoxy benzyl stearate, benzyl palmitate, 4-nitrobenzyl stearate, neopentyl caprylate, neopentyl laurate, neopentyl stearate, neopentyl behenate, cyclohexyl laurate, cyclohexyl myristate, cyclohexyl palmitate, cyclohexylmethyl stearate, 2-cyclohexyl ethyl stearate, stearyl cyclohexylpropionate, 3-phenylpropyl stearate, 4-methoxybenzyl caproate, 4-methoxybenzyl caprate, 2-chlorobenzyl myristate, 4-isopropylbenzyl stearate, phenyl 11-bromolaurate, 4-chlorophenyl 11-bromolaurate, didecyl adipate, dilauryl adipate, dimyristyl adipate, dicetyl adipate, distearyl adipate, dibenzyl sebacate, distearyl tere-phthalate, dineopentyl 4,4'-diphenyldicarboxylate, dibenzyl azodicaroboxylate, trilaurin, trimyristin, tristearin, dimyristin and distearin.

When present, the amount of solvent for promoting temperature hysteresis in compositions of the invention may vary depending on the particular color former and color developer compositions, stimulus of color change, type of chromic transition, where in some embodiments the amount ranges from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

Where the color former and color developer composition is a thermochromic system which undergoes a color change in response to a change in temperature (e.g., heat, cooling), additives that modify chromic transition temperatures may also be included in the subject color change compositions. By "modifying" chromic transition temperatures is meant that the temperature threshold for chromic transition is increased or decreased by adding one or more of the temperature modifying additives. Additives for modifying chromic transition temperatures in thermochromic color change compositions of interest may include, but are not limited to oils including organic, natural, inorganic, and synthetic oils such as corn oil, various vegetables oils, nut oils, root oils, herbal oils, paraffin oils, greases, animal fats, natural extract oils, flavor based oils, aromatic based oils, industrial oils, among other types of oil.

When present, the amount of additive for modifying chromic transition temperature in compositions of the invention may vary depending on the particular color former and color developer compositions, stimulus of color change, type of chromic transition, where in some embodiments the amount ranges from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

In some embodiments, color change compositions may also include one or more antioxidants or preservatives. Antioxidants of interest may include, but are not limited to water soluble antioxidants, such as ascorbic acid, cysteine hydrochloride, sodium bisulfate, sodium metabisulfite, sodium sulfite among other water soluble antioxidants; oil-soluble antioxidants, such as ascorbyl palmitate, butylated hydroxyanisole (BHA), butylated hydroxytoluene (BHT), lecithin, propyl gallate, alpha-tocopherol, among other oil-soluble antioxidants; as well as metal chelating agents, such as citric acid, ethylenediamine tetraacetic acid (EDTA), sorbitol, tartaric acid, phosphoric acid, among other chelating agents.

The amount of antioxidant or preservatives in compositions of the invention may vary depending on the particular color former and color developer compositions, stimulus of color change, type of chromic transition, where in some embodiments the amount ranges from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

Color change compositions of the invention may further include one or more adhesives, such as for example where the color change composition may be employed as an tape, such as a specialty tape, repositionable tape, packing tape, permanent label, peelable-resealable tape, among other types of tapes.

Where compositions include an adhesive, the adhesive may be a polymeric acidic composition formulated alone or with its associated ester. Solvent and tackifying agent may also be added to the adhesive composition to provide pressure sensitive adherent properties. Solvents of the adhesive can include, but are not limited to aqueous solvents, organic solvents, low volatility organic solvents, and inorganic fluids. In some embodiments, the solvent system is selected to provide: 1) adhesive properties; 2) low volatility (e.g., to avoid the negative impact of evaporation); 3) adequate solubilization of the polymeric acid composition; and 4) mobility and interaction with the color former and color developer composition without interfering with chromic transition. Tackifiers may also be added to added to ensure pressure sensitive contact. Tackifiers of interest include, but are not limited to carboxylated monoesters of polyglycols, etc.

The adhesive composition may also include a polymeric binder. Polymeric binders can be chosen from a large series of different polymers. Polymers may be soluble or alkali-soluble and compatible with the used tackifier. Suitable water-soluble and alkali-soluble polymers are e.g., polyvinylpyrrolidone, polyacrylic acid, polymethacrylic acid, copolymers of acrylic acid with alkyl esters of acrylic or methacrylic acid wherein the alkyl group comprises 1 to 4 carbon atoms such as methyl acrylate and n-butyl acrylate, with the proviso that the acrylic acid content is at least above 70% in the case of methyl acrylate and above 85% in the case of n-butyl acrylate, further copolymers of maleic acid and e.g. ethylene, vinyl methyl ether and vinyl acetate, dimethylhydantoin-formaldehyde resin and polyethylene imine.

The polymerization of acrylic acid and methacrylic acid and the copolymerisation of these acids with lower alkyl esters of acrylic acid (methyl, ethyl, butyl) may be carried out in solution in water, in methanol or in mixtures of both according to known polymerisation techniques, e.g. according to the methods described in Houben-Weyl, "Methoden der organischen Chemie", Makromolekulare Stoffe, vol. 14/1, pages 1018-1021, Georg Thieme Verlag, Stuttgart (1961). Polymerisation may also occur according to known methods in a non-solvent, whereby the polymer formed precipitates out of solution. In the same way emulsion copolymerisation techniques may be applied when mixtures are used of acrylic acid or methacrylic acid with alkyl esters thereof, wherein the ratio of acid component is relatively low (30 to 55% by weight).

The amount of polymeric binder present in the adhesive may vary widely, such as from 1% to 99% w/w, such as from 5% to 95% w/w, such as from 10% to 90% w/w, such as from 15% to 85% w/w, such as from 20% to 80% w/w, such as from 25% to 75% w/w, such as from 30% to 70% w/w, such as from 35% to 65% w/w and including from 40% to 60% w/w.

In certain embodiments, the adhesive composition functions as both an adhesive and color developer. For example, adhesives of interest may include those described above having a polyacrylic acid and associated acid ester where the adhesive functions as both the developer and as a pressure sensitive adhesive. In certain embodiments, adhesives may be Tesafix™ 4965 (Tesa AG Quickbornstr, 24 D-20253 Hamburg Germany) and related adhesive tapes such as Tesafix™4972.

Where the adhesive composition functions as both an adhesive and color developer, the amount of adhesive composition in the subject color change compositions may vary from 1% to 99% w/w, such as from 5% to 95% w/w, such as from 10% to 90% w/w, such as from 15% to 85% w/w, such as from 20% to 80% w/w, such as from 25% to 75% w/w, such as from 30% to 70% w/w, such as from 35% to 65% w/w and including from 40% to 60% w/w.

In some embodiments, the subject color change compositions may also include one or more tackifying agents or resins. Hydrocarbon tackifiers of interest include petroleum based feedstocks made of one or more of aliphatic tackifiers (C5, i.e., polymers composed of five-carbon aliphatic monomers), aromatic tackifiers (C9, i.e., polymers composed of nine-carbon aromatic monomers), dicyclopentadiene (DCPD), or mixtures thereof. For example, the subject tackifying agents may include a C5/C9 aliphatic/aromatic resin where the C5 tackifier is copolymerized with aromatic monomers.

Alternatively, tackifying agents may include polymers containing acidic side chains such as methacrylic acid, acryloyl chloride, acrylamine co-mixes, acrylate co-polymer admixes, sodium polyacrylate, propionic acid polymers, acryloyl groups, methacrylic acid derivatives, ethylacrylic acids, or mixtures thereof.

When present, the amount of tackifying agents in compositions of the invention may vary depending on the particular color former and color developer compositions, stimulus of color change, type of chromic transition, where in some embodiments the amount ranges from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

The subject compositions may also include one or more modulating agents or matrices. By "modulating" is meant a compound, layer or matrix that, when present, increases or decreases the rate of color formation by the color change composition, in some embodiments by facilitating the stability of encapsulation, migration or diffusion of one or both of the color former or color developer. Modulating agents and matrices may be passive or active in functioning to offset, separate, control, modulate, accelerate, delay, attenuate, or predictably influence the interaction between color former and color developer.

In some embodiments, the modulating agent is an accelerating agent, which increases the rate of chromic transition by the color change composition. Accelerating agents may include compounds that facilitate the breakdown of encapsulation, semi-encapsulation, migration, or diffusion of one or both color developer or color former in response to the applied stimulus. For example, the accelerating agent may decrease the time required for chromic transition by 1 second or more, such as 2 seconds or more, such as 5 seconds or more, such as 10 seconds or more, such as 30 seconds or more, such as 60 seconds or more, such as 5 minutes or more, such as 10 minutes or more, such as 30 minutes or more and including decreasing the time required for chromic transition by 60 minutes or more.

In other embodiments, the modulating agent may be a decelerating agent which decreases the rate of chromic transition by the color change composition. Decelerating agents may include compounds that facilitate the stability of encapsulation, semi-encapsulation, migration, or diffusion of one or both color developer or color former upon exposure to the applied stimulus. For example, the decelerating agent may increase the time required for chromic transition by 1 second or more, such as 2 seconds or more, such as 5 seconds or more, such as 10 seconds or more, such as 30 seconds or more, such as 60 seconds or more, such as 5 minutes or more, such as 10 minutes or more, such as 30 minutes or more and including increasing the time required for chromic transition by 60 minutes or more.

The exact composition, thickness or concentration of the modulating agent or substrate may vary depending on the particular color former and color developer compositions, stimulus of color change and type of chromic transition.

In some embodiments, the modulating agent is a modulating layer positioned between the color former compound and color developer compound such as for example, films, adhesive layers, wax layers, diffusion layers, porous layers melting layers, high viscosity layers positioned between the color former compound and color developer compound which is sufficient to block or delay the onset of color development. For instance, one or more blocking layers may be employed to provide a delay in chromic transition after exposure to the applied stimulus for 1 second or longer, such as 5 seconds or longer, such as 10 seconds or longer, such as 30 seconds or longer, such as 60 seconds or longer and including 5 minutes or longer.

In certain embodiments, the modulating layer is a hydrocarbon layer. In these embodiments, the chromic transition occurs as the color developer migrates through the hydrocarbon layer and subsequently interacts with the color former resulting in chromic transition.

Modulating agents and matrices of interest may include, but not limited to waxes, acrylics, plastic resins, carboxy methyl cellulose (CMC), printing varnishes, hydrocarbon layers, nitrocellulose, paraffin, microcrystalline waxes, natural waxes, clay coatings, coating resins, tapes, non-developer containing adhesives, particulate, micro-particulate, thin metal layers, plastic film layers, dried protein layers, dried cellulosic layers, spray coated layers, surfactant layers, emulsifiers, membranes, semi-permeable membranes, filters, transparent layers, compliant layers, sharp melting point mediums, long chain amines, long chain carboxylic acids, long chain weak acid donors, charge carrying polymers, polymerize waxes, alkylated polymers, polyenes, polyolefins, polyethylene glycols, polypropylene glycols, clay coatings, and the like.

The subject color change compositions may also include one or more buffering agents. The term "buffering agent" is used in its conventional sense to refer to a solution of weak acid (and conjugate base) or weak base (an conjugate acid) that is employed to modulate the pH of a composition. Any convenient buffering agent may be employed, including but not limited to phosphate buffers (e.g., PBS), tris-buffers, citrate buffers (e.g., sodium citrate), acetate buffers (e.g., sodium acetate) borate buffers (e.g., borax) and combinations thereof, among other buffering systems. For example, in certain instances the buffering agent is a two-component buffer of sodium phosphate and citric acid having a pH range from 3.0 to 8.0.

The amount of buffering agent in compositions of the invention may vary ranging from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

Color former and color developer compositions according to certain embodiments of the invention may also include one or more luminescent or fluorescent compounds. For example, luminescent compounds may include visible as well as non-visible spectrum fluorescent dye compounds, chemiluminescent dye compounds as well as solvatoluminescent and hydroluminescent dyes compounds. Colors can be deeply enriched using fluorescent and glow-in-the-dark or photo-luminescent pigments as well as related color additives. For example, color can be obscured by an one color of a diacetylenic composition or other thermochromic dye such that when a temperature triggering event occurs, the fluorescent signal becomes visible when utilizing the corresponding wavelength to reveal the fluorescent dye composition. Luminescent compounds of interest may include, but are not limited to fluorescein, fluoresceine, resourcinolphthalein, rhodamine, imidazolium cations, pyridoimidazolium cations, dinitrophenyl, tetramethylrhodamine, among other types of luminescent compounds.

The amount of luminescent agent in compositions of the invention may vary, ranging from 0.0001% to 99% w/w, such as 0.001% to 95% w/w, such as 0.01% to 90% w/w, such as 0.1% to 85% w/w, such as 0.5% to 80% w/w, such as 1% to 75% w/w, such as 5% to 70% w/w, such as 10% to 65% w/w and including 1% to 25% w/w.

Methods for Preparing Color Change Compositions

Aspects of the invention also include methods for preparing the subject color change compositions. In some embodiments, methods for preparing the color change compositions may be characterized by a first process of producing an a color former and color developer composition, which includes combining one or more color former compounds with one or more color developer compounds, and then a second process of producing the final color change composition by combining the color former and color developer composition with an amount of a copolymer sufficient to eliminate background color of the color former and color developer composition during transition from a first color state to a second color state. Additives can be incorporated into the subject compositions either when producing the color former and color developer composition or alternatively when combining the color former and color developer composition with the copolymer.

In other embodiments the color change compositions are prepared by simply combining the color former compound, color developer compound and copolymer (and additives, where desired) simultaneously.

In certain methods, an amount of one or more color former compounds and an amount of one or more color developer compounds are mixed together, either with or without a solvent, to produce a color former and color developer composition. Where a solvent is not employed, the color developer compound may be in a molten state (i.e., liquid or melted) to function as a solvent such that the color former may be dissolved directly into the color developer compound. One or more additives (e.g., tackifying agents, adhesives, luminescent dyes, etc.) may also be mixed into the color former and color developer composition. Where a solvent is employed, each additive may be separately dissolved in a solvent and then added to the color former and color developer composition or the additive may be added neat into the composition. Where a solvent is not employed, each additive may be dissolved directly into the color developer compound.

Where the color former and color developer composition is first produced before mixing with the copolymer, methods of the invention further include contacting an amount of the color former and color developer composition with an amount of one or more of the subject copolymers that are sufficient to eliminate background color of the color former and color developer composition during transition from the first color state to the second color state. Depending on the physical state of the copolymer, the copolymer may be combined with the color former and color developer composition in molten form, dissolved in a solvent or as a solid (e.g., powder, granule, flake, etc.) Where the copolymer is in the form of a solid, the particle size of the copolymer may be reduced before mixing the components together. The particle size may be reduced by any convenient protocol and may include but is not limited to lump breakers, hammermills, fine grinders, classifier mills or sifters, among other particle size reduction protocols. In certain embodiments, to reduce the particle size, the copolymer is a powder and is passed through a mesh screen. Depending on the particle size desired, the mesh screen may vary. In some embodiments, the mesh screen is a 2 mesh screen or smaller, such as a 4 mesh screen or smaller, such as a 10 mesh screen or smaller, such as a 20 mesh screen or smaller, such as a 30 mesh screen or smaller, such as a 40 mesh screen or smaller, and including a 60 mesh screen or smaller.

In some embodiments, all of the components of the subject compositions (e.g., color former compound, color developer compound and any optional additives) are added to a mixer simultaneously. In other embodiments, each component may be added to a mixer sequentially. In certain embodiments, each component may be added to a mixer in a specific order. For example, in certain instances, methods include adding the components of the subject composition to the mixer in the order: 1) an amount of solvent, if present; 2) an amount of color developer (in molten form if no solvent is employed); 3) an amount of color former; 4) copolymer sufficient to eliminate background color of the color former and color developer composition during transition from a first color state to a second color state; and 5) any desired additives. In some embodiments, each of the components may be mixed concurrently while being added to the mixer. In other embodiments, all components of the subject compositions are first added to the mixer and then the entire composition is mixed.

The subject color change compositions may be mixed by any convenient mixing protocol, such as but not limited to planetary mixers, Patterson-Kelley blender, hand mixers, standup mixers, inline mixers, powder liquid mixers, batch mixers, kneaders, agitator drives, impellers, hydrofoil mixers, aerators, among other mixing protocols.

In embodiments of the invention, the subject color change compositions are mixed for an amount of time sufficient to incorporate each component and to produce a homogenous mixture. For example, the color change compositions may be mixed for 1 minute or more, such as 2 minutes or more, such as 3 minutes or more, such as 5 minutes or more, such as 10 minutes or more, and including 15 minutes or more.

In certain embodiments, the pH of the composition may be adjusted while mixing the components of the color change composition. By adjusting the pH is meant the pH of the composition is either increased or decreased, as desired. In some embodiments, the pH of the composition is adjusted to have a pH which ranges from 3 to 10, such as 4 to 9, such as 4.5 to 8.5 and including a pH of from 5 to 7. The pH of the composition may be adjusted using any convenient protocol. In some embodiments, the pH is decreased by adding an acid (e.g., HCl). In other embodiments, the pH is increased by adding a base (e.g., NaOH). In certain embodiments, the pH of the composition may be adjusted by adding a buffer to the any of the components, such as by adding an amount of sodium citrate dihydrate.

The properties of the subject color change compositions or any intermediate compositions produced during methods of preparing the subject color change compositions may be characterized at any convenient time. The term characterizing is used to refer to the analysis of one or more of the properties and/or components of the subject color change compositions or any intermediate compositions produced during methods for preparing the subject color change compositions. Characterizing may include, but is not limited to, determining the pH, physical properties (e.g., solid density, water content), content assay (API), spectroscopic properties, particle size distribution and impurity composition (trace metals, relating substances, etc.). Methods for analyzing compositions of the invention may include, but are not limited to the use of high performance liquid chromatography (HPLC), gas chromatography, ionization spectroscopy, among other types of analysis.

In some embodiments, methods of the invention also include assessing the properties of the characterized composition. By "assessing" is meant that a human (either alone or with the assistance of a computer, if using a computer-automated process initially set up under human direction), evaluates the determined composition and determines whether the composition is suitable or unsuitable to continue on to the next step of preparation. If after assessing that the determined composition is suitable, each composition may proceed to the following step without any further adjustments. In other words, methods of these embodiments include a step of assessing the determined composition to identify any desired adjustments.

In some embodiments, methods include monitoring each step in preparing the subject color change compositions. In some embodiments, monitoring includes collecting real-time data (e.g., pH, content assay, moisture content), such as by employing a detector to monitor each composition. In other embodiments, monitoring includes characterizing each composition at regular intervals, such as every 1 minute, every 5 minutes, every 10 minutes, every 30 minutes, every 60 minutes or some other interval.

After the components of the subject compositions are sufficiently mixed, a master batch may be produced. Master batches of the subject compositions may be formed into any convenient form, such as pellets, granules, powder, flakes, small discs, cubes, tiles, rods, ingots, slugs, sheets, sticks, blocks, dowels, cords, extruded shapes, tubes, balls, molded shapes, slab forms, pan shapes, casted shapes and bullions, among other forms of master batches. In some embodiments, a liquid (e.g., molten) master batch is produced. In other embodiments, master batches of the color change compositions are pelletized. In yet other embodiments, master batches of the color change compositions are shape molded into ingots, tubes, discs, sticks or other convenient shape. In still other embodiments, master batches of the color change compositions are granulated. Where the subject compositions are granulated, the color change composition master batch granules may be formed by milling the mixture of color former and color developer composition and copolymer. By milling is meant, grinding or otherwise processing the solid color change composition to reduce the particle size of the dried composition. The composition may be milled by any convenient milling protocol, for example, round impellers, axial flow impellers, radial flow impellers, ball mill, rod mill, autogenous mill, pebble mill, grinding rolls, buhrstone mills, semi-autogenous mill, vibratory mill or roller mill, among other protocols.

In certain embodiments, color change compositions of interest are prepared as a pseudo master batch. In producing a pseudo master batch of the subject compositions, a mixture of the components (e.g., color former and color developer) are combined as an aqueous slurry with an emulsifier and a powdered plastic resin. The aqueous slurry mixture is then dried (e.g., by flash drying) to form a powder, granulate, flake or particulate without the need to pelletize or shape mold the composition to form a master batch.

Suitable emulsifiers for producing a pseudo master batch may be any convenient emulsifying agent, including but not limited to cationic, anionic or non-ionic emulsifiers, such as for example, diacetyl tartaric acid esters, acetic acid esters of monoglycerides, citric acid esters of monoglycerides, lactic acid esters of monoglycerides, mono- and diglycerides, polyglycerol esters of fatty acids, polyglycerol, polyricinoleate, propylene glycerol esters of fatty acids, sorbitan tristearate, sorbitan monostearate, among other types of emulsifying agents.

Suitable powdered plastic resins for producing the pseudo master batch may be any convenient thermoplastic composition or other type of polymeric plastic, including by not limited to polyvinyl chloride (PVC), various polyolefins such as polypropylene and polyethylene, high density polyethylene (HDPE), low density polyethylene (LDPE), cross-linked high-density polyethylene (XLPE), softened acrylic, ABS, thick Kapton™ tape materials, Teflon® (polytetrafluoroethylene (PTFE), tetrafluoroethylene TFE and fluorinated ethylene polypropylene FEP)-based materials, brand names such as Kydex, polystyrene, thermoplastic polyesters, nylon, styrene-butadiene, epoxy casts, polybutylene, TPX (poly(methyl pentene), terephtalate polyethylene (PET), PETE, PETF, polyethylene teraphthalate G copolymer (PETG), polysulfone (PSF), polyurethane (PUR) Thermanox™ (TMX), polymethylmethacrylate, ethylenechlorotrifluoreethylene (ECTFE), ethylentetrafluorethylene (ETFE), polinvinylidene fluoride (PVDF), ethylene-propylene rubber (EPR), silicone rubber (SI), Alcryn® thermoplastic rubber (TPR), HT thermoplastic rubber (HTPR), Santoprene® thermoplastic rubber (TPR), LSOH cross-linked compounds, LSOH thermoplastic compounds, methylvinyletherfluoralkoxy (MFA), perflouroalkoxy (PFA), thermoplastic polyester elastomer (TPE), polyimide (Kapton®), polyurethane (PUR), polyvinyl chloride 105° C. (PVC), polyvinyl chloride 70° C. (PVC), low temperature polyvinyl chloride (LTPVC), oil resistant Polyvinyl chloride (OR PVC), semi rigid polyvinyl (SR PVC), polyvinyl chloride polyurethane (PVC PUR), copolyester (COPET, PCTA, PCTG), polycarbonate, styrene acrylonitrile (SAN), glycolised polyester terephthalate (glycolised polyester, PETG), styrene dutadiene copolymers (SBC), cellulose acetate propionate (CAP), and the like. By powdered is meant, at least in some instances, a solid substance reduced to a state of fine, loose particles by crushing, grinding, disintegration, etc.

In one example, a pseudo master batch may be produced by mixing an amount of a composition having a leuco dye, glycerol monostearate derivative and a copolymer of formula (I) described above:

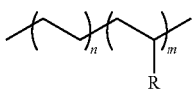

Formula (I)

as an aqueous slurry with an amount of an aqueous cationic polyethylene emulsion and powdered polyethylene. After mixing the slurry to form a uniform paste, the paste is spray dried in a drum dryer to produce a large granulated pseudo master batch composition without the need for pelletization or shape molding.

In another example, a pseudo master batch may be produced by mixing an amount of a composition having a leuco dye, glycerol monostearate derivative and a copolymer of formula (II) described above:

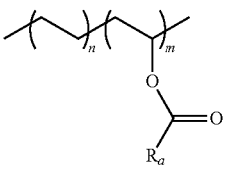

Formula (II)

as an aqueous slurry with an amount of an aqueous cationic polyethylene emulsion and powdered polyethylene. After mixing the slurry to form a uniform paste, the paste is spray dried in a drum dryer to produce a large granulated pseudo master batch composition without the need for pelletization or shape molding.

In yet another example, a pseudo master batch may be produced by mixing an amount of a composition having a leuco dye, glycerol monostearate derivative and a copolymer of formula (III) described above:

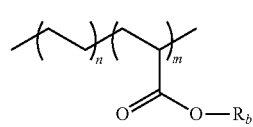

(Formula III)

as an aqueous slurry with an amount of an aqueous cationic polyethylene emulsion and powdered polyethylene. After mixing the slurry to form a uniform paste, the paste is spray dried in a drum dryer to produce a large granulated pseudo master batch composition without the need for pelletization or shape molding.

Pseudo Master Batch Compositions

Pseudo master batch compositions, in some embodiments, are not limited to the above-described color change compositions. Methods for preparing pseudo master batch compositions may, in certain embodiments, be used to prepare a wide range of different pseudo master batch compositions, such as those described in greater detail below.

In certain embodiments, aspects of the invention include a method of making a pseudo master batch composition by contacting an aqueous composition and a powdered plastic resin with a plasticizing emulsifier to produce a plasticized composition and flash drying the plasticized mixture to produce a pseudo master batch composition. For example, the aqueous composition may be a slurry, such as a slurry which includes one or more compounds that are microencapsulated. In some instances, the slurry includes a slurry of a color change composition, such as a dye, thermochromic compound, photochromic compound or a pigment. In one example the aqueous compositions include one or more leuco dyes, such as two or more leuco dyes, such as three or more leuco dyes and including 5 or more leuco dyes. In certain examples in preparing the subject pseudo master batch compositions, the one or more leuco dyes are microencapsulated. The produced pseudo master batch composition, in certain instances, may be granulated, powdered or in the form of flakes.

The prepared pseudo master batch compositions according to some embodiments are homogeneous granulated or powdered compositions having one or more non-plastic compounds, a plastic resin and a plasticizing emulsifier. In other embodiments, the pseudo master batch composition is a homogeneous granulated or powdered composition having a first plastic composition, a plastic resin and a plasticizing emulsifier.

Certain advantages to pseudo master batch include, but are not limited to: cost reduction, lower pigment loading required, simplicity of processing, direct conversion of an aqueous composition to a dried plastic powder in a single drying step, energy savings, the process can be readily scaled from a laboratory bench level to a high-volume production level, ease of direct extrusion to final plasticized master batch, compositions amenable to low extrusion temperatures, elimination of heat stress for drying slurries, the process is amenable to a wide range of compositions, product applications, production formulations, and the like. In certain instances, pseudo master batch production is amenable to forward and reverse phase processing from hydrophobic to hydrophilic states; from hydrophilic to hydrophobic states and from one like-kind state to another like-kind state.

In some embodiments, pseudo master batch compositions find use with temperature sensitive materials, shear sensitive materials, and materials of non-like-kind nature that tend to separate on not disperse in alternate phases. For example, pseudo master batch compositions may be applied in the preparation of sensitive and high value dye systems such as micro-encapsulated pigments, dyes, leuco dyes, fluorescent dyes, evanescent dyes, reversible and irreversible color change dyes, non-dye systems and specialty chemistries such flavors, aromatic compositions, drugs, pharmaceuticals, topical materials, cosmetics, injestible compounds, fine reagents, biological materials, bio-pharmaceutical materials and the like.

Slurries and emulsions can be used in mixing, compounding and drying conditions provided by pseudo master batch production. For example, liquid based thermochromics, photochromics, fluorescent dyes, standard dyes, specialty dyes, optical shift agents, specialized pigments, lake dyes, microencapsulated pigments, specialty chemicals, organic and inorganic compounds and materials, low or high value additives, and the like may be compounded under pseudo master batch processing conditions.

Often there are disadvantage to common slurry drying systems such as: agglomeration, caking, agglutination, crusting, the formation of hard granulated materials that then need subsequent dispersion, heat stress to sensitive materials, oxidation, contamination, lengthy and costly processing steps, and generally a lack of protection from degradation of sensitive materials. Pseudo master batch processing by comparison provide an instant transition form one state to a second state in single mixing and drying step. The process provides a compounded end product that can be readily utilized and processed in subsequent production methods intended for the end products. By way of example, not limitation, color change leuco dyes can be directly converted from an aqueous slurry to a plasticized powder or pellet that can be directly utilized in plastics engineering. Standard method of drying and processing leuco dye slurries require high temperature drying methods, multiple steps, re-suspension and dispersion and often re-heating and compounding until they are suitable for use. Standard method of leuco dye drying and compound can lead to significant losses in color intensity and performance compared to pseudo master batch processing. The end result of pseudo master batch production provides a means to use lower concentrations of costly materials combined with a lower cost production methods that can dramatically reduce pricing and increase performance by comparison.

In certain embodiments, aspects of the present invention include a method of making a leuco-dye pseudo master batch composition by contacting an aqueous leuco dye composition and a powdered plastic resin with a plasticizing emulsifier to produce a plasticized leuco dye composition and flash drying the plasticized leuco dye composition to produce a leuco dye pseudo master batch composition. For example, the aqueous leuco dye composition composition may be a slurry, such as a slurry which includes one or more leuco dyes that are microencapsulated. In one example the aqueous compositions include one leuco dye or more, such as two or more leuco dyes, such as three or more leuco dyes and including 5 or more leuco dyes. In certain examples in preparing the subject pseudo master batch compositions, the one or more leuco dyes are microencapsulated. The prepared pseudo master batch composition, in certain instances, may be granulated, powdered or in the form of flakes. For example, in certain embodiments the prepared pseudo master batch composition may be a homogeneous powdered leuco dye-plastic resin pseudo master batch composition having one or more leuco dyes, a plastic resin and a plasticizing emulsifier.

In general pseudo master batch finds direct and relevant utility to plastics extrusion and injection molding with or without post pelletizing the final composition. The granular nature of pseudo master batch along with it density that is in close proximity to the density of many key resins used in the plastics industry, allow it to be directly used in combination with plastics during the injection molding process, extrusion process, blow molding process, compression molding process or any of a variety of processes utilized in the plastics industry.

By contrast, pseudo master batch processing also lends itself to reducing cost and increasing value to low value high volume recyclable materials such as wood, plastics, metals, minerals, rock, and other generally disposable commodities. In certain embodiments, methods for preparing pseudo master batch composition can used to rapidly recycle and utilize materials that are often too costly and difficult to re-utilize.

Certain food, drug, and cosmetics may also be prepared as a pseudo master batch composition. For example, food colors, flavors, and additives that are often difficult to dry, sensitive to high heats and oxidation, and are not physically or chemically compatible can be prepared as a pseudo master batch. In certain instances, dry beverage based additives, flavors and colors intended for rapid dispersion into liquids can be prepared as a pseudo master batch composition.

The exact and final concentration will vary depending on the desired loading of the pseudo master batch component of interest. In the event that powder forms of pseudo master batch compositions are used directly with plastic resins the pseudo master batch composition may be present at a final concentration from between 0.5% and 50% by weight of the plastic resin used for making a certain plastic article, such as from 1% to 25% by weight, and including in the range of 2.5% to 10% by weight.

The addition of pseudo master batch as a powder directly to a plastic resin to be processed can be facilitated and assisted by first prior coating the plastic carrier resin with an oil or coating composition that improves adherence of the powdered pseudo master batch to the carrier resin of interest. For example mineral oil can be used to coat polyethylene of polypropylene with a thin adherent film that bind subsequently added powdered pseudo master batch. The combined mixture can be easily tumbled to uniformly coat the plastic resin pellets with the pseudo master batch. The final mixture can be added plastics processing equipment hoppers and the like and directly utilized for production.

Oil and or adherent coatings can range from 0.01% to 50% by weight, such as in the range from 0.1% to 25% by weight, such as in the range from 0.2% to 10%, and including in the range from 0.5% to 5% by weight. Depending on the coating properties, final concentration of pseudo master batch utilized, resin particle dimensions, and the material processing parameters utilized to make the plastic article of final interest.

Oil and adherent coatings can include, but are not limited to mineral oils, mineral oils of different molecular weight cut-offs, silicon oils, long chain fatty acids, lipids, lubricating oils, liquid hydrocarbons, emulsifying oils, natural oils, vegetable oils, nut oils, liquid waxes, glycerol, long chain alcohols, commercial petroleum oils and pastes, low molecular weight oils, pure oils, mixed oil systems, low viscosity and/or high viscosity oils and the like. The type of oil used as an adherent coating will depend on the application of interest, the pseudo master batch applications and general composition to be deployed.

In certain embodiments, pseudo master batch compositions of interest are prepared from: photochromic slurries, fluorescent slurries, other water based emulsions that have application to pelletized additives used for injection molding or extrusion including, tagging agents, anti-slip agents, anti-oxidants, UV inhibitors, anti-static agents, foaming agents, blow agents, optical agents, various plastic colorants and the like.

In some embodiments, plastics applied as pseudo master batch are converted to a powdered master batch or to a palletized concentrated master batch. The conversion can be accomplished any convenient palletizing protocol. For example, the plastic pseudo master batch be prepared as plastic pellets by strand extrusion and high speed cutting. In some instances, the strand extrusion method involves air cooling or water cooling the strands prior to cutting. Alternatively, alternate palletizing process can be utilized such as water ring palletizing or front surface air cooling palletizing.

Due to the pigment protective nature of the pseudo master batch a wide range of palletizing process can be utilized. For example, as an alternative to more standard palletizing processes, pseudo master batch can be melted in a continuous format into sheets, beads, and other geometries. The process can involve integrated steps such as drying pseudo master batch followed in-line by melting the master batch, cooling and setting a particular geometric shape of the final mixture, and finally followed by possibly cutting or crushing the final particulate or collecting in a set shape.

In certain embodiments, the protective nature of the pseudo master batch process provides for a variety of implementation means for utilizing it as concentrate additive in a wide arrange of different processing methods. The surfactant post encapsulation and dispersion of a particular agent of interest incorporated into pseudo master batch enables the agent to be well protected under hash or severe processing conditions such as plastics extrusion or plastics injection molding. In some instances, pseudo master batch processing provides a protective extra encapsulation process that further ensures optimal protection and distribution/dispersion of technical agents with in a matrix. In some instances, methods of interest include making an emulsified slurry composition by contacting an aqueous slurry having one or more microencapsulated compounds with a powdered hydrophobic composition and a plasticizing emulsifier to produce plasticized composition and drying the plasticized composition to produce a plasticized slurry composition having one or more microencapsulated compounds. For example, the microencapsulated compound may be a color change compound as described herein, such as one or more leuco dyes. In other instances, methods include a method of making a pseudo master batch composition by contacting a hydrophilic composition and a hydrophobic composition with a plasticizing emulsifier to produce a plasticized hydrophilic-hydrophobic composition and flash drying the plasticized hydrophilic-hydrophobic composition to produce a pseudo master batch composition. For example, the hydrophilic compound may be a wood composition, ceramic composition, color change composition or other hydrophilic composition as described in greater detail below. Likewise, the hydrophobic composition is, in certain instances, a plastic composition, such as a plastic resin including, but not limited to: polyvinyl chloride (PVC), various polyolefins such as polypropylene and polyethylene, high density polyethylene (HDPE), low density polyethylene (LDPE), low linear density polyethylene (LLDPE), homo-polymer polyethylene (HPPE), polypropylene (PP), linear polypropylene (LPP), homo-polymer PP (HPP), cross-linked high-density polyethylene (XLPE), ethyl vinyl acetate (EVA), EVA's with different vinyl acetate concentrations, softened acrylic, ABS, thick Kapton™ tape materials, Teflon® (polytetrafluoroethylene (PTFE), tetrafluoroethylene TFE and fluorinated ethylene polypropylene FEP)-based materials, brand names such as Kydex, polystyrene, thermoplastic polyesters, nylon, styrene-butadiene, epoxy casts, polybutylene, TPX (poly(methyl pentene), terephtalate polyethylene (PET), PETE, PETF, polyethylene teraphthalate G copolymer (PETG), polysulfone (PSF), polyurethane (PUR) Thermanox™ (TMX), polymethylmethacrylate, ethylenechlorotrifluoreethylene (ECTFE), ethylentetrafluorethylene (ETFE), polinvinylidene fluoride (PVDF), ethylene-propylene rubber (EPR), silicone rubber (SI), Alcryn® thermoplastic rubber (TPR), HT thermoplastic rubber (HTPR), Santoprene® thermoplastic rubber (TPR), LSOH cross-linked compounds, LSOH thermoplastic compounds, methylvinyletherfluoralkoxy (MFA), perflouroalkoxy (PFA), thermoplastic polyester elastomer (TPE), polyimide (Kapton®), polyurethane (PUR), polyvinyl chloride 105° C. (PVC), polyvinyl chloride 70° C. (PVC), low temperature polyvinyl chloride (LTPVC), oil resistant Polyvinyl chloride (OR PVC), semi rigid polyvinyl (SR PVC), polyvinyl chloride polyurethane (PVC PUR), copolyester (COPET, PCTA, PCTG), polycarbonate, styrene acrylonitrile (SAN), glycolised polyester terephthalate (glycolised polyester, PETG), styrene dutadiene copolymers (SBC), cellulose acetate propionate (CAP), and the like. In some embodiments, the hydrophilic composition is a wood composition and the hydrophobic composition is a polyethylene or polypropylene resin. In certain instances, the wood composition may be an aqueous wood slurry, dampened wood powder or dry wood powder.

Pseudo master batch production and applications can range over a variety of compounds, compositions, physical types, and chemical properties. By way of example, not limitation, pseudo master batch can be used for processing material with different properties including: hydrophilic compounds into hydrophobic environments; hydrophilic compounds into hydrophilic environments; hydrophobic compounds into hydrophobic environments; hydrophobic compounds into hydrophilic environments; aqueous pseudo master batch; solvent based pseudo master batch drying and processing and the like. The exact composition and formulation for pseudo master batch processing will depend on the material properties of interest and the intended application of interest.

Candidate Materials for Pseudo Master Batch and Concentration Ranges:

Technical agents and additives suitable for incorporation and dispersion into pseudo master batch include, but are not limited to: thermochromic slurries and compounds, photochromic slurries and compounds, fluorescent dye slurries, IR dye slurries, security dyes, technical component slurries and encapsulated slurries, re-cycled or re-processed wood-plastic composition for plastic wood extrusion, water and oil based flavors and aromatic compounds, security dyes for adding to plastics, tagging agents for identifying a particular processors product, various micro-encapsulated compounds, none micro-encapsulated compounds, anti-bacterial compounds, shear sensitive materials, calcium carbonate and fillers, pearlescent materials, glow-in-dark pigments, slow release nutritional compounds, slow release pharmaceutical compounds, vaccine components, drug delivery components, industrial agents and components, blow agents for foamed expansion, sensitizing agents and components, technical organic compositions, accelerated bio-degradable additives, food starch and polylactic acid (PLA), coffee concentrates, tea concentrates, ceramic micro-spheres, tagging agents for security, dissolving and dispersing agents, anti-fungal agents, deodorant compositions and agents, sunscreen additives, absorbent compounds for litter boxes, oral sensitizing compounds, color stabilizing compounds, evanescent micro-encapsulated compounds, optical brighteners, YAG, CO2 and other laser marking additives, and the like.

Pseudo master batch can be used for a range of technical, non-technical, sensitive, industrial, commercial and other additive applications. For example, areas of application may include, but are not limited to: compounding for industries, pharmaceuticals and drugs, industrial processing, production of house hold and consumer products, food and beverage-concentrates for dispersion and addition, cosmetics and dermatologic applications, coatings and paint, the recycling industry, wood-plastic compositions, environmentally friendly products where dispersion of recycled materials will find use, composites that enable the dispersion of non-like-kind materials, plastic-mineral compositions, a wide range of micro-encapsulation products and the like.

General Technical Agents and Additives to Pseudo Master Batch Pre and Post Processing:

A wide range of additives can be included in the final formulation of a particular master batch derived from the pseudo master batch process. Additives can be included depending on the final formulation, intended use, improved qualities of the final product, function of the final product, processing characteristics during manufacturing and the like. For example, additives can include, but are not limited to: ethylene bis stearamide as a protective lubricant, anti-caking agents to reduce build up at dies and during processing, anti-static agents to reduce the complications of static, anti-oxidants to reduce oxidation and accelerated aging, other lubricants to improve processability, fillers to improve performance and reduce cost of goods, dispersing agents to improve active agent dispersion into matrices, various optical agents and stationary colors and the like.

Pseudo Master Batch Mixing Processes:

Wet/damp components of pseudo master batch can be mixed in a variety of conventional commercial and industrial mixing units. By way of example, not limitation, commercially available mixing units can include: dough mixers, mortar mixers, cement mixers, blade mixers, ribbon mixers and the like. In embodiments, mixing is thorough and ensures that any particulate achieves full coating and uniformity with a particular emulsifying agent. It is desirable to utilize a continuous mixing process where ingredients can be added sequentially and that the mixing process can be maintained during the addition steps. Likewise, it is relevant to utilize mixing processes where loading and unloading are convenient and efficient.

Pseudo Master Batch Drying Processes:

Pseudo master batch drying processes can be utilized that are efficient for water content from 10% by weight to 80% by weight, such as ranging from 15-40% by weight. Drying process can include by way of example, not limitation: static drying using commercial drying vats or reactors, static rack drying with continuous air flow, spary drying or atomization, fluid bed drying, levitated fluid bed drying, through-material forced air bed drying, conveyor drying, oven drying, convection oven drying, furnace drying, IR lamp drying, radiation heat drying, freeze drying, powder drying processes, tumble drying, forced air drying, and the like. Drying can include injected heat, variable heating levels, variable forced air volumes (cubic feet per minute).

In some embodiments, due to the damp low density congealed nature of certain pre-mixed pseudo master batch compositions, the moderate water content, and the large surface area resulting from the presence of the powderized plastic resin-carrier, through-material forced air bed drying processes may be used. For example, batch volumes of mixed pseudo master batch can be loaded into a through-material dryer and dried within 1-6 hours. In some instances, through-material drying can be accomplished within 1.5-2.5 hours, resulting in an efficient high throughput manufacturing process. In certain instances, by injecting hot air into the drying unit and incorporating in-unit heaters, a temperature rise can be achieved from room temperature to over 100° F. Additionally, certain through-material dryers permit uniform air volumes to be forced through the pseudo master batch material. Likewise, since certain pseudo master batch compositions are trapped and held in a specified space, loading, drying, clean-out, and repetition is extremely efficient.

One suitable through-material forced air dryer can be constructed having a closed off chamber equipped with a high volume blower (2,000 to over 8,000 cubic feet per minute). The dimension for the chamber can be a base of 40×40 inches squared and 40-45 inches tall. To improve energy efficiency and insulation, the chamber can be made with wood, an insulating layer on metal, or an insulating plastic. The top is open with a slot to slide in open-meshed drying screens for air to travel through. Heaters can be placed externally to the blower to inject hot air into the blower and internally to the chamber to increase circulating air temperature within the chamber. Slots in the top the open chamber provide a convenient means to slide in a drying screen. The drying screen's outer dimensions match the slot to ensure a tight fit. The drying screens come in pairs. The lower screen is equipped with side walls for to place and hold moist pseudo master batch. The lower screen also has a rubberized seal to mate and seal with a second upper screen of the same dimensions. The upper screen also has a rubberized seal to ensure complete seal air-tight around the two screens when they are stacked. The lower screen is installed at the top of the chamber.

A volume of pseudo master batch is placed on the lower screen to entirely fill the screen to the brim of the side-walls. The second screen is placed parallel and on top of the first screen and pseudo master batch. The pseudo master batch is trapped and contained between the laminating screens such that air can only be transported through the master batch material. The upper screen is secured with straps, bolts, cords, or latches to ensure that the sandwiched screens and pseudo master batch are fully secured. Once secured, the blower can be activated so that air entering the chamber is forced vertically up and only through the open mesh of the bottom containing screen, through the moist pseudo master batch material, and exits the upper open mesh screen. Upon activation of heaters, pseudo master batch is can be conveniently dried within a 2 hour period.

Due the low drying temperatures employed and high air volume passage through the pseudo master batch matrix, no burning, browning, shearing, there is no degradation of the material properties of the pseudo master batch induced by the drying process. Cleaning and replacement of pseudo master batch in the drying unit is convenient as a result of the simple chamber construction.

Drying screen meshes for through-material forced air dryers can range from 60 mesh to 390 mesh, such as in the range from 100 mesh to 300 mesh and including in the range of 150 mesh to 250 mesh. Mesh materials can be made with stainless steel or a plastic fiber (nylon or polyester).

Pseudo Master Batch Plastic Resins:

Where rapid and uniform agent dispersion in a plastic pseudo master batch composition is desired, a powder-granulated form of a plastic matrix-carrier resin can be employed. Powderized plastics find use in rotational molding and other related processes where it is useful to rapidly melt and disperse agents in a processed plastic. Likewise, pseudo master batch compositions benefit from the small particulate granular nature of carrier resins due to the large surface area for exposure and small particle size closer to pigment particle sizes. In some embodiments, suitable palletized resin may range in size from 2 millimeters to 5 millimeters in diameter. Pulverized plastic powder and rotational molding resin granules can be specified to range in size from 1 micron to 1 milimeter, such as in the range of 5 microns to 500 microns and including in the range of 10 microns to 250 microns.

The final particle size and desired distribution will depend on the final application of interest and compatibility with the technical agents of interest to be incorporated in to the corresponding pseudo master batch formulation. In certain embodiments, the small granular nature of pulverized plastic powders provide particle sizing within a range that facilitate rapid incorporation of a technical agent into a plasticized environment facilitated by the emulsification and homogenized mixing of a compatible surfactant.

Powderized granulated plastic carrier resins can include, but are not limited to any convenient thermoplastic composition or other type of polymeric plastic, such as for example to polyvinyl chloride (PVC), various polyolefins such as polypropylene and polyethylene, high density polyethylene (HDPE), low density polyethylene (LDPE), low linear density polyethylene (LLDPE), homo-polymer polyethylene (HPPE), polypropylene (PP), linear polypropylene (LPP), homo-polymer PP (HPP), cross-linked high-density polyethylene (XLPE), ethyl vinyl acetate (EVA), EVA's with different vinyl acetate concentrations, softened acrylic, ABS, thick Kapton™ tape materials, Teflon® (polytetrafluoroethylene (PTFE), tetrafluoroethylene TFE and fluorinated ethylene polypropylene FEP)-based materials, brand names such as Kydex, polystyrene, thermoplastic polyesters, nylon, styrene-butadiene, epoxy casts, polybutylene, TPX (poly (methyl pentene), terephtalate polyethylene (PET), PETE, PETF, polyethylene teraphthalate G copolymer (PETG), polysulfone (PSF), polyurethane (PUR) Thermanox™ (TMX), polymethylmethacrylate, ethylenechlorotrifluoroethylene (ECTFE), ethylentetrafluorethylene (ETFE), polinvinylidene fluoride (PVDF), ethylene-propylene rubber (EPR), silicone rubber (SI), Alcryn® thermoplastic rubber (TPR), HT thermoplastic rubber (HTPR), Santoprene® thermoplastic rubber (TPR), LSOH cross-linked compounds, LSOH thermoplastic compounds, methylvinyletherfluoralkoxy (MFA), perflouroalkoxy (PFA), thermoplastic polyester elastomer (TPE), polyimide (Kapton®), polyurethane (PUR), polyvinyl chloride 105° C. (PVC), polyvinyl chloride 70° C. (PVC), low temperature polyvinyl chloride (LTPVC), oil resistant Polyvinyl chloride (OR PVC), semi rigid polyvinyl (SR PVC), polyvinyl chloride polyurethane (PVC PUR), copolyester (COPET, PCTA, PCTG), polycarbonate, styrene acrylonitrile (SAN), glycolised polyester terephthalate (glycolised polyester, PETG), styrene dutadiene copolymers (SBC), cellulose acetate propionate (CAP), and the like.

In certain embodiments, fluorescent pigments and slurries that can be prepared as pseudo master batch compositions. For example, certain fluorescent slurries may include fluorescent pigments such as SPL-11J Aurora Pink, SPL-12J, Neon Red, SPL-13J Rocket Red, SPL-14J Fire Orange, SPL-15J Blaze Orange, SPL-17J Saturn Yellow, SPL-21J Corona Magenta. Formaldehyde free version include: SPL-11N Aurora Pink, SPL-13N Rocket Red, SPL-14N Fire Orange, SPL-15N Blaze Orange SPL-17N Saturn Yellow, SPL-18N Signal Green, SPL-19N Horizon Blue, SPL-21N (GS) Corona Magenta SPL-25N, Horizon Blue (RS), and SPL-594N Invisible Blue. Fine grind/particle size fluorescent pigments include: EC-594 Invisible Blue, ECX-11 Aurora Pink, ECX-13 Rocket Red, ECX-15 Blaze Orange, ECX-17 Saturn Yellow, ECX-18 Signal Green, ECX-19 Horizon Blue, ECX-20 Pluto Purple, ECX-21 Corona Magenta, and ECX-34 Strong Saturn Yellow.

In other embodiments, other colorants may be prepared into a pseudo master batch composition, such for example AIT Colorants Aqueous In-Plant Tinting, Fluorescent Water Dispersions, HI-TINT Dispersions, NVC Colorants, Omni Tint, Phantom Water Dispersions Invisible Yellow AIT-4466, Plast-E-Tint (PET) Conventional Dispersions, Plast-E-Tint (PET) Fluorescent Dispersions, SPLASH Colors-Pantone Blends, SPLASH Colors SPL-J Dispersions, AIT118 White Dispersion, AIT222 Toluidine Red Dispersion, AIT244 Red Iron Oxide (YS) Dispersion, AIT254 Quinacridone Red Dispersion, AIT334 DNA Orange Dispersion, AIT364 Yellow Oxide Dispersion, AIT374 Permanent Medium Yellow Dispersion, AIT385 Brilliant Yellow G Dispersion, AIT389 Hansa Yellow HS Dispersion, AIT421 Brown Iron Oxide Dispersion, AIT434 Raw Umber Dispersion, AIT444 Burnt Sienna Dispersion, AIT454 Burnt Umber Dispersion, AIT544 Phthalo Green BS Dispersion, AIT644 Phthalo Blue RS Dispersion, AIT648 Ultramarine Blue Dispersion, AIT684 Carbazol Violet Dispersion, AIT734 NF Black (Non-Flaking) Dispersion, AIT744 Lampblack Dispersion and the like.

In certain embodiments, filler materials are prepared as a pseudo master batch composition. For example, plastic, wood, plant matter, leaves, pine needles, construction site reclamation, paper, soil, landfill, sand, cement, concrete, asphalt, rubber, used, tires, rock, oil, calcium, metals. ceramic, glass, food stuffs, crop waste, silt, general garbage, waste from printing processes, general fillers, computer waste, consumer product waste, compost waste matter, landfill waste matter, rubbish, road-side waste, ocean pollution, used oils, rubber, recycled plastics, filtered waste, highly 100% proven sterilized medical waste, 100% proven sterilized waste matter, fabrics, news papers, magazines, and the like can be utilized alone or in combination as pulverized/powderized fillers in the pseudo master batch process. One or more filler composition can be used in combination with an emulsifier for creating a common amalgamation or admixture and a plastic component for binding in the final pseudo master batch composition. In certain embodiments, methods of interest include making a pseudo master batch from recycled materials, such as recycled wood, cement, concrete, paper, plastics, among other types of recycled materials, by contacting a composition having one or more granulated recycled materials and a powdered plastic resin with a plasticizing emulsifier to produce a plasticized recycled material composition and flash drying the plasticized recycled material composition to produce a pseudo master batch composition of one or more recycled materials. In some embodiments, a pseudo master batch composition of one or more recycled materials of interest includes recycled wood, such as recycled wood stirrers. In other embodiments, a pseudo master batch composition of one or more recycled materials of interest includes recycled glass, such as pulverized glass bottles.

Dyes, pigments, blocking agents, aroma inducing compositions, optical agents, and/or a variety of other additives can be added in the pseudo master batch manufacturing process to ensure the final desired effect of the multi-element compounded material. Additives will be utilized at a specific and determined concentration to generate the final physical and/or chemical compounded material.

Sterilization processes can be employed to ensure that final pseudo master batch compositions are suitable for selected food grade and related applications. By way of example, UV, gamma irradiation, solar irradiation, 200° C. or above temperature exposures at corresponding dwell times, possible addition of anti-microbial agents if required, dehydration, high pressure sterilization, freeze fracturing, high sheer, and/or a combination of parameters can be utilized as commercial process.

Depending on the utility and application of use, caution will need to be taken to ensure the traceability and contamination free level of additive is maintained. By way of example, not limitation, recycled or vested materials to be utilized for a particular application should be: none radio active, non-carcinogenic, sterilized, non-heavy metal containing, non-phthalates, and the like.

In some embodiments, pseudo master batch compositions are prepared with a plasticizing emulsifier. In certain embodiments, the plasticizing emulsifier is present in an amount sufficient to promote a common surface characteristic for none like-kind materials and substances to co-exist. In some embodiments, plasticizing emulsifying agents when dried, are present in an amount sufficient to enhance the cohesive interaction between a final plastic matrix comprising the end multi-component composition. In certain instances, the emulsifying agent is present at a concentration that when coated on a mass of mixed particulate, dominates the surface characteristics of the varying particulate types to a more homogenous and common processing state. Emulsifying agents can be neutral or charged. Charged emulsifying agents can be cationic or anionic. Solids and active agents in an emulsifying formulation can be of use in the emulsion from concentration from less than 0.1% to over 50% by weight in a solution, such as from between 1% to 50% and including from 5% to 35%.

A wide range of aqueous emulsions can be utilized in compounding and processing pseudo master batch. Emulsion selection will depend on the final application of interest, what technical material is to be utilized in the formulation of interest, the characteristics and synergy between the additives and agents utilized, and a variety of processing conditions. Emulsions is present in the subject pseudo master batch compositions, in certain instances in an amount of from 0.1% to 50% by weight of the final pseudo master batch composition, such as from 0.5% and 40% by weight, such as from 1% to 30% and including from 10 to 25% by weight of the final pseudo master batch composition.

Example emulsions may include, but are not limited to: Michem® Emulsion 09625: Cationic ethylene acrylic acid emulsion, Michem® Emulsion 09730: Cationic polyethylene emulsion, Michem® Emulsion 11226: Cationic polypropylene emulsion, Michem® Emulsion 1270: Slip and anti-block additive, Michem® Emulsion 13025: Slip and anti-block additive, Michem® Emulsion 18325: Nonionic polyethylene wax emulsion, Michem® Emulsion 21030: Anionic polyethylene emulsion, Michem® Emulsion 21930: Anionic Tung Oil emulsion, Michem® Emulsion 24414: Anionic camauba wax emulsion, Michem® Emulsion 27720: Nonionic slip and anti-block additive, Michem® Emulsion 28640: Cationic polypropylene emulsion, Michem® Emulsion 29730: Nonionic polyethylene emulsion, Michem® Emulsion 32535: Nonionic, polyethylene emulsion, Michem® Emulsion 34935: Anionic paraffin/ethylene acrylic acid wax emulsion, Michem® Emulsion 36840: Anionic paraffin/polyethylene wax emulsion, Michem® Emulsion 37135: Nonionic polyethylene emulsion, Michem® Emulsion 39235: Nonionic high density polyethylene emulsion, Michem® Emulsion 41740: Nonionic, polyethylene emulsion, Michem® Emulsion 42035A: Cationic water based emulsion of polyolefin waxes, Michem® Emulsion 43040: Nonionic polypropylene emulsion, Michem® Emulsion 43240: Polypropylene emulsion, Michem® Emulsion 44730: Nonionic ethylene acrylic acid copolymer, Michem® Emulsion 45745P: Nonionic Polyethylene wax emulsion, Michem® Emulsion 47950: Nonionic paraffin emulsion, Michem® Emulsion 48040M2: Nonionic microcrystalline wax emulsion, Michem® Emulsion 48625M1: Polymer solution, Michem® Emulsion 51715: Nonionic wax emulsion blend, Michem® Emulsion 52137: Nonionic polyethylene emulsion, Michem® Emulsion 52830: Anionic polyethylene wax emulsion, Michem® Emulsion 53145: Nonionic co-emulsion, Michem® Emulsion 61222: Water based emulsion of montan based ester wax, Michem® Emulsion 61335: Anionic polyethylene emulsion, Michem® Emulsion 62330: Anionic paraffin/polyethylene emulsion, Michem® Emulsion 65140: Nonionic polypropylene emulsion, Michem® Emulsion 65435: Nonionic ethylene acrylic acid emulsion, Michem® Emulsion 66035: Anionic paraffin/polyethylene wax emulsion, Michem® Emulsion 70750: Anionic scale wax emulsion, Michem® Emulsion 71150: Anionic scale wax emulsion, Michem® Emulsion 71731MOD: Anionic paraffin emulsion, Michem® Emulsion 72040: Nonionic polyethylene wax emulsion, Michem® Emulsion 73950: Cationic paraffin emulsion, Michem® Emulsion 79535: Nonionic polyethylene/polypropylene blend, Michem® Emulsion 80939M: Nonionic paraffin wax emulsion, Michem® Emulsion 91240: Nonionic polyethylene emulsion, Michem® Emulsion 91240G: Nonionic polyethylene emulsion, Michem® Emulsion 91735: Nonionic polypropylene emulsion, Michem® Emulsion 91840: Nonionic HD polyethylene/paraffin wax emulsion, Michem® Emulsion 93135M: Nonionic polyethylene emulsion, Michem® Emulsion 93235: Nonionic polyethylene emulsion, Michem® Emulsion 93335: Nonionic polyethylene emulsion, Michem® Emulsion 93935, Nonionic polyethylene emulsion, Michem® Emulsion 94340, Nonionic polypropylene emulsion, Michem® Emulsion 98040M1, Nonionic Fischer Tropsch wax emulsion Michem®, and Emulsion D310 Anionic polyamide dispersion.

The subject pseudo master batch compositions possess amenable processing temperatures, strength of adhesive and cooperative binding, a transition state from a heated fluid state to a solid cooled state, adjustable characteristics such as adjustable melt-flow indexes, strength and structural integrity in the solid state, good flow characteristics for plastics processing such as extrusion and injection molding, surface texturing and modifications for attractive end finishes, polishing, high capacity for inclusion of foreign particulate, ease of coloring and tinting for various applications and the like.

Colorants, dyes, tinting agents, optical agents, surface effect pigments and the like can be utilized to convert the appearance of the final pseudo master batch amalgamation to a an attractive and desirable fixture or article. For example, a wood-plastic stir stick can be compounded completely of recycled materials of foreign origin using pseudo master batch processing and yet be colorized, extruded and finished to resemble a wooden stir stick or alternatively a pure plastic stir stick. The exact visual appearance or coloration can be compensated for during the pseudo master batch process.

In some embodiments, methods interest include making a wood-plastic pseudo master batch composition by combining a wood composition and a powdered plastic resin with a plasticizing emulsifier to produce a plasticized wood-plastic resin composition; and flash drying the plasticized wood-plastic resin composition to produce a wood-plastic pseudo master batch composition. For example, the wood may be an aqueous wood slurry, a dampened wood composition or a dry wood powder. Wood may be of any convenient type of wood depending on the wood-plastic pseudo master batch composition desire. For example, suitable types of wood may include, but is not limited to pine, cedar, celery-top pine, cypress, Douglas-fir, European yew, fir, hemlock, Huon pine, kauri, nutmeg-yew, larch, red cedar, redwood, cherry, rimu, sprice, sugi, white cedar, Nootka cypress, abachi, African padauk, afzelia, agba, alder, American chestnut, ash, aspen, ayan, balsa, basswood, beech, birch, blackbean, black tupelo, blackwood, boxelder, boxwood, Brazilian walnut, Brazilwood, bubinga, buckeye, butternut, bay laurel, camphor, carapa, catalpa, Ceylon satinwood, coachwood, cocobolo, corkwood, cottonwood, cucumbertree, dogwood, ebony, elm, eucalyptus, crabapple, pear, greenheart, granadilla, guanandi, gum, hackberry, hickory, hornbeam, hophornbeam, iroko, ironwood, kingwood, lacewood, limba, locust, mahagony, maple, marblewood, marri, meranti, merbau, oak, okoume, olive, pink ivory, poplar, purpleheart, ramin, redheart, sweetgum, sandalwood, sapele, sassafras, silky oak, silver wattle, sourwood, tamboti, teak, rosewood, tupelo, turpentine, walnut, wenge, willow, and zingana among others.

Utility

The above described compositions and methods find use in any application where an applied stimulus (e.g., temperature change) indicator is desired.

In some embodiments, the subject compositions find use for a wide range of temperature, sensing, indicating, measurement, marking, cold-chain-management, perishable composition monitoring, safety, sensitizing, industrial, food service, pharmaceutical, industrial, processing, food processing, consumer products, household products, toy products, publishing, advertising, promotional dental, security, pharmaceutical, food products, novel packaging, skin care and skin health, pressure monitoring, temperature monitoring, humidity monitoring, time monitoring, environmental monitoring, inventory monitoring, medical and other market and/or product applications and the like.

Compositions of the invention find use in early stage production, manufacturing, or synthesis stages through to end-of-use indication where a product being monitored using an indicator or composition has already expired and is no longer of any further value. Compositions of the invention also find use in a variety of different applications, including but not limited to: color development for cold chain management; ascending temperature indicator as color is develops; ascending temperature indicator where color development lock occurs at set points; shunted color development dependent on time along one axis and temperature along another; site addressable flash imaging using ascending temperature leuco dyes; 3D flash imaging using ascending temperature leuco dye; messages that appear as color develops rather than ink opacity changing to make message appear; reversible color development candles; reversible color development printable dyes; irreversible color development thermal inks and papers; toys applications that turn color upon touching; ascending temperature indicating composition for lotions and emollients; physiologic temperature status determination devices; hydration indicating composition for lotions and emollients to determine physiologic hydrations status; developers that co-act as alternative active agents e.g. flavors, fragrances, stimulants; long-term hysteresis effect and reversal using water reactivation based on aqueous slurry inks; long-term hysteresis effect and reversal using heat reactivation based on aqueous slurry inks; flexographic in-line layering/manufacturing as a production means for tunable color indicating systems; ultra-sharp critical melting point mediums for digital color development; ascending reversible color development leuco dye; ascending reversible color development leuco dye with hysteresis; temperature adjustable ascending color development leuco dye; micro-encapsulated ascending color development leuco dye; co-solvent-developer single component molecule; hydrochromic reversible color development leuco dye; mixed ascending and descending reversible leuco dyes; natural co-developer-solvent for ascending color development; natural co-developer-solvent for descending color development; single component as dual solvent and color developer properties; slurry concentrates of natural ascending and descending leuco dyes; leuco dye color formers—developed by polydiacetylenic developers; reversible color to colorless based on temperature; reversible colorless to color based on temperature; reversible color to colorless based on hydration; reversible colorless to color based on hydration; reversible color to colorless based on solvation; reversible colorless to color based on solvation; irreversible colorless to color based on temperature; irreversible color to colorless based on solvation; reversible non-hysteresis color change; reversible color change with hysteresis types; irreversible non-hysteresis color change; irreversible color change with hysteresis types.

Compositions of the invention also find use in low temperature range monitoring. Low temperature (−200° C. to 25° C.) application ranges include ranges for perishable items such as food, beverages, alcoholic beverages, pharmaceutical products, blood, bio-pharmaceutical products, sensitive chemistries, rare materials, biological specimens, virulent bacteria and virus, DNA and RNA storage, and a number of other temperature sensitive items or products that require temperature history and storage conditions to be monitored and recorded.

Compositions of the invention also find use in medium temperature range monitoring. Medium temperature (26° C. to 60° C.) applications include ranges for perishable items that expire at elevated temperatures, warm holding temperatures, monitoring medium temperature processes for process validation and quality control, storage conditions, warming foods, monitoring plant growth conditions, monitoring environmental conditions and living conditions, industrial applications including manufacturing processes, storage of explosives, monitoring shipping storage containers from overseas suppliers, monitoring logistics of foods and goods cross country, in-flight monitoring of air freighted goods, and the like.

Compositions of the invention also find use in high temperature range monitoring. High temperature (61° C. to 600° C.) applications include ranges for perishable items that expire at elevated temperatures, hot holding temperatures, monitoring hot temperature processes for process validation and quality control, storage conditions, heated foods, monitoring high temperature conditions, hot holding food service applications where time and temperature monitoring is important, monitor food processes that require limited time exposure at elevated temperature for food preparation, re-heating applications, microwave cooking applications where foods need to be heated and maintained at elevated temperatures for complete and thorough cooking, monitoring environmental conditions and living conditions, industrial applications including manufacturing processes, storage of military items, high temperature monitoring shipping storage containers from overseas suppliers, novel autoclave and sterilization conditions, medical equipment sterilization, monitoring logistics of foods and goods cross country, in-flight monitoring of air freighted goods, and the like.

Applications of Color Change Compositions

The following practical examples of applications for the subject color change compositions are offered by way of illustration and not by way of limitation.

Substrate Types Utilized for Coating with Tunable Compositions:

The subject color change compositions can be applied and utilized with a wide range of substrates (indicating substrates). Indicating substrate compositions include but are not limited to paper, plastic, hard surfaces, soft surfaces, stiff or rigid surfaces, compliant surfaces, printed surfaces, printable surfaces, transparent surfaces, semi-transparent surfaces, opaque surfaces, non-transparent surfaces, skin, finger nails, molded surfaces, flexo-graphic printing surfaces, foam surfaces, expanded plastic surfaces, insulating surfaces, conducting surfaces, conducting ink surfaces, and the like. A substrate composition can be comprised of thick or thin materials ranging in thickness from 1 nanometer to 100 centimeters. Often thicknesses will range from 10 nanometers to 10 centimeters. More often substrates suitable for indicating compositions will range from 1 micron to 1 centimeter. Typical substrates will range from 10 microns to 5 millimeters and most often in the range between 0.1 millimeters and 1.0 millimeters.

Optical Pattern and/or Message Development:

Optical patterns can be developed under triggering conditions using optical color change dye systems in combination with modeled substrate surfaces. An image can be generated by applying a pressure indicating film over a substrate layer that has been pre-surface textured or patterned. As temperatures are induced the dye layer initially comes in contact with the close proximity regions or features of the patterned substrate surface. An initial color change will occur in the dye layer the emulates the upper surfaces of the substrate. As temperatures continue to increase, the dye layer may be forced in contact with lower regions of the substrate surface texture. Images or patterns can appear differentially as a result of the final temperature induced between the temperature indicating dye layer and the patterned or textured substrate. Partial images can be made to occur at lower temperatures. More complete or developed images or messages can be made to appear at medium pressures. Fully developed images or completed messages can be made to appear at final desired induced temperature.

Machine-Readable Chemistries and Device Configurations:

In certain embodiments, the subject compositions of the invention find use in machine-readable applications. Machine-readable chemistry and device configurations can include, but are not limited to, various printed barcodes, Interactive barcodes, abuse security barcodes; 1D, 2D, and 3D; barcodes holographic barcodes, vision imaging systems, transient barcodes, time-only barcodes, freshness indicating barcodes, shape memory bar codes, and a variety of other applications and formats.

Compositions herein can be formulated and utilized in a variety of visual, scanning, imaging, and machine readable processes as they relate to temperature monitoring algorithms. Messages or codes can be made to appear or disappear; parts or elements of graphics, symbols or codes can be utilized to make the element, graphic, or code un-discernable or unrecognizable until that portion of the medium has changed with temperature or the like.

Color change compositions can be utilized in both visual and machine aided formats. Visual readings are made with distinct visual determination of a threshold color change that occurs. Machine aided formats are made using an optical or electrical interpreted change in a color hue or conductive characteristic in a co-topo-polymeric composition that undergoes a state threshold change. By way of example, but not limitation, a composition can be printed or formulated in a machine viewable format. A measurable reading may be taken of an initial colorimetric state. A second or sequential reading can be measured as threshold state occurs. During the transition from one state to another state, an instrumented reading can be registered. The threshold transition can be measured against a calibrated reading such that the degree or magnitude of the state threshold change can be recorded and monitored. Recorded and monitored machine measurements can be displayed by instrumentation utilized in the machine aided format.

Machine readable/responsive barcodes can be utilized for determining the presence of or responding to a temperature fluctuation, visible light, ultra-violet light, irradiation for applications such as food sterilization including gamma and cobalt 60 irradiation levels, hydration, pressure changes, high pressure events including high pressure sterilization, contaminations such a heavy metal contamination, alcohol levels, poisons, chemical sensing, biological compositions, chemical reagents, non-specific analyte binding, specific analyte binding, gases, physical and mechanical responses, UV intensity, light intensity, sanitization conditions, mechanical stress conditions, pressurization formats, oxidation state, optical bleaching, end-of-use indication, time, time and temperature, free radical content, hydration state, skin care health, medical sterilization, clinical health status, indicating sensors on food storage containers medical status, security applications, anti-tampering applications, and any of a number of other measurable indicia.

Machine readable codes for indicating time duration for product shelf-life and use indication can be accomplished using sensing compositions that shift spectrally in response to ambient conditions and product storage.

Also of interest are barcodes embedded or obscured with the subject color change composition that is selectively revealed upon triggering at set points of co-topo-polymeric indicator.

A range of barcode languages can be utilized that can be partially of fully associated with a composition and therefore act as a machine readable indication means to measure and report the selective functionality intended to comprise the co-topo-polymeric composition used for indication. Barcode types include, but are not limited to any language, a wide range in size and numbers of character, as well as the barcode language of interest: 39, 93, 128A, 128B, 128C, A standard barcode or UPC code can be obscured, coated, embedded in or over-laid by a mixed or single component chromic change agent. Part of the standard bar code can be clearly visible at the beginning of reading so as to generate an initial starting parameter set. Selective portions of the barcode can be covered by discrete compositions that are set to change color at pre-determined temperature exposures. As the barcode is placed on a product type at a lowered temperature the chromic change agent can be activated. On activation, pre-determined elements of the code will be obscured by the optical density of the chromic change agent (i.e., the color change composition). The optical density of the barcode will be set such that a barcode reader will not be able register the obscured portion/bars that represent a specific code sequence. As the barcode/product is raised in temperature and as pre-selected temperature are achieved and exposed, a pre-determined section of bar code will be revealed (reversibly or irreversibly depending on the nature of the chromic change agent selected). As each temperature threshold is achieved during the temperature exposure process, each pre-determined/coated barcode region will be come machine readable. In some instances, an indicator may be configured as a linear segmented barcodes that differentially respond to temperature and/or time-temperature along their axis.

Non-readable or partially readable barcodes utilizing single or mixed compositions as the obscuring agent are readily scanned for activity or inactivity in part or in whole.

Compositions herein and other blue/black bar codes provide a unique optical masking characteristic that makes a partially readable of fully non-readable part or all of the modified bar code. In addition the transition of a blue/black compositions and compounds to a red or orange hue including but not limited to light pink to dark red hues, provides for high optical readability by most commercial barcode readers since the red, orange, pink or related hues are optically transparent to the red light sources utilized in standard barcode readers.

Readable barcode languages include but are not limited to: Morovia Code 25, 11, 12B. 139. UPC-A, UPC-E, EAN-8, EAN-13, code 128b, USS 39, USD 3, 3 of 9 code, code 39. hibcc. Java applet, logmars, full, symbology, industry 2 of 5, discrete, self checking codes, msi, plesssey, one-dimensional barcodes, two-dimensional barcodes, three-dimensional barcodes, halographic barcodes, luminescent barcodes, and the like.

Barcode formats of interest include, but are not limited to: Off to On switching barcodes; On to off switching barcodes; Codes 39 and 93 for embedded thermal messaging; various barcode geometries, such as planar, curved, round, etc.; barcodes configured for thermal delay for time temperature coding; freshness indicating barcodes; time-only indicating barcode; etc.

In some instances, one may have re-programmable barcodes that can be re-set among, in between or adjacent to a bar code set through re-printing a region of interest.

Activation Label for Monitoring Time-Temperature Color Development:

Activation or initiation of the time and temperature dependent color development process begins upon intimate interaction of essential system components. Activation can be accomplished manually by applying a label containing one component to a substrate containing a second member. Both members are required for initiation and color development. In a second example activation can begin upon label application and contact between two members of the full color development pair by using automated labeling equipment.

Wrap around label applicators can be used for activation at the labeling point using labels constructed with one member of a color system on one surface and the other member on the opposing surface. During wrap around label application the bottom portion of a label will come in contact with the second member to initiate the color development process.

Pull tab activation finds use where semi-manual activation approaches are desired. A pull tab can be used to separate the two component color development system such that when the separation tab is pulled, the pulling process draws one layer member in intimate contact with the other layer member. Activation begins during the adhesion process.

Blocking layers can be utilized where by the blocking layer keeps dormant and maintains separation between two layer components until an elevated temperature or time is achieve. When a threshold temperature is achieved thereby melting or diffusing the blocking layer, both color former and color developer layer are allowed to interact and the color development process can proceed above the designated temperature or at any point where the blocking layer is eliminated.

Pressure initiated activation can be utilized whereby pressure is required to force on layer of a pair in direct contact with the second layer to induce intimate contact. Off-setting spacers can be used to separate one layer from the other. A gap can be placed between the two layers filled by only air or a displacing composition. As presser is placed on one layer, the second layer is forced to interact and initiate the color development process.

Blister packing constructs can be utilized where by on member of an activating pair can be placed distal to a second layer using a displacing plastic indented structure. As the indented structure is deformed or flattened, the deformation process forces both members of the color development pair to interact and initiate the color development process.

Bubble burst activation can be utilized whereby both members of a color development pair are separated by an air or gas pocket. Separation is disrupted by pressing and rupturing the bubble. An added sound effect can be elicited as an audio confirmation of initiating the color development process. Bubble separators can be further used to generate patterns during multiple adjacent ruptures. Advertising or promotional applications will find use as arrays of bubble activating patterns can be utilized.

Direct Thermal Label and Color Sensitive Medium Integration:

Completed constructs can be utilized where existing thermal papers, films, labels or substrates and carbonless papers, films, or substrates can be paired with the subject color change compositions. An example carbonless copy paper may be prepared by placing a first sheet of paper coated on one side with a hydrophilic colloid solution in which are dispersed microcapsules of oil droplets containing a colorless electron donor dye into contact with a second sheet of paper coated with an absorbent and an electron accepting color developer compound. The heat resistance and moisture resistance of the copy paper is substantially improved by adding to the hydrophilic colloid solution a graft copolymer having a backbone of carboxymethyl cellulose or gum arabic and side chains of polyacrylic acid or polymethacrylic acid. The image response time of the second sheet can be improved by adding pectin or sulfated starch to the coating. Substrates such as these can be utilized in combination with the subject color change compositions create a time or time-temperature indicator device.

Time-Temperature and Temperature Thermometers:

Visually read thermometers and sensors can be produced using the subject color change compositions. Thermometers can include a color forming layer on a substrate, a delay or temperature responsive blocking layer, and a pre-adhered color developing layer. The selection of components can be used to pre-set the time-temperature and temperature triggering temperature threshold of the thermometer.

In particular, the blocking layer positioned between the color forming layer and the adhered color developing layer can be formulated with a blocking compound that responds to and transforms to a permeable layer at a specified temperature. For example, the blocking layer may be a sharp melting point medium such as a wax, paraffin, or other commercially available sharp melting point medium. Upon melting, softening, or becoming permeable, the blocking layer will no longer be able to block or inhibit interaction between the color development system and an irreversible color will develop at the pre-determined temperature setting.

A time-delay can be introduced into the thermometer by adjusting the diffusion path, permeability characteristics of the blocking layer, composition of the color forming layer, and composition of the color developing layer, such as for example 1 second or more, such as 5 seconds or more, such as 60 seconds or more, such as 5 minutes or more, such as 30 minutes or more, such as 1 hour or more, such as 5 hours or more, such as 10 hours or more and including 24 hours or more.

Thermometers employing the subject compositions can measure temperatures ranging from sub-freezing to over 1,000° C. In some embodiments, the temperature ranges from −5° C. to 500° C., such as from 10° C. to 250° C.

Graphics and Messaging:

Messages, symbols, illustrations, titles, graphics, text, text messages, messages in general, images, icons, licensed figures, numerical values, hidden messages, line art, detailed art, multi-colored images, embedded graphics, graphic elements or entire graphics, visual que's, obscured images, partial images, pricing information, security information, promotional information, safety information, marks, patterns, and the like can be combined with the subject color change compositions.

Graphic and messaging information can be printed with the subject color change compositions and combined with stationary graphics and messages. In addition, stationary inks and the subject color change compositions can be combined in ways to generate messages that appear and disappear.

Graphic overlay patterns can be employed whereby the graphic overlay obscures an a color developing graphic or message composed of the subject color change composition. As the color change composition undergoes chromic transition, the color obscured by the stationary graphic overlay pattern until development proceeds to an intensity that the developing ink becomes discernable through the graphic overlay pattern.

Alternatively, a developing graphic or image comprising the developing ink can be printed in a trapped pattern that is compatible or continuous with the developing ink. Initially, the message is apparent. As the developing ink continues to develop, it will become similar in pattern, hue, and intensity with the stationary graphic. At a pre-described time or time-temperature profile, the developing pattern color and pattern matches the stationary pattern and becomes indiscernible against the background and the message or graphic appears to disappear.

A wide range of graphic and messaging formats can be utilized to emphasize, obscure, confuse, re-register, change, morph, transition, alter, become apparent, alter, integrate or the like to achieve a desired result that best suit the readout or resulting effect intended for a particular product application of interest.

The following examples are offered by way of illustration and not by way of limitation.

EXPERIMENTAL

Color Former/Color Developer Compositions
A. Reversible Color Development Hydrochromic Inks:

A pre-colored reversible hydrochromic ink is prepared using a two component solution mixture containing developer and color former. The developer solution is prepared using 10% by weight developer (Pergafast 201, Ciba AG CH) dissolved in 90% polyethylene glycol average molecular weight 1,450 g/mol (Sigma Chemicals). The mixture is brought above 200° F. and mixed until the solution becomes clear. A color former solution is prepared using 20% by weight color developer Specialty Magent 20 (Emerald Hilton Davis, LLC) dissolved in 80% by weight polyethylene glycol average molecular weight 1,450 g/mol (Sigma Chemicals). The mixture is brought above 200° F. and mixed until the solution becomes clear.

The developer solution and color former solutions are kept heated mixed. A slight magenta color develops. The solution is allowed to cool to 160° F. 3 volumes of hot water (greater than 160° F.) is added during vigorous mixing. An immediate magenta colored emulsion is formed and the solution is allowed to thicken during cooling to room temperature. To the concentrated slurry, one or more of acetate polymer ethyl vinyl acetate or acrylate polymers ethylene ethyl acrylate, ethylene methyl acrylate or ethylene butyl acrylate may be added. The concentrated slurry having incorporated copolymer may be removed for addition to an ink vehicle or used directly as a coating ink.

B. Reversible Color Development Hydrochromic Papers:

An aqueous slurry ink is coated on standard white bond paper. The coating is warm air dried. The initially colored—hydrated ink is converted to a colorless state during drying. Drying and conversion to a colorless state may be facilitated using forced warm air.

Color markings, drawings, graphics, message writing, symbols and the like may be generated by applying a water marker, pen, swab, stamp to the colorless coated area of the paper. Colors generated by contact with water are observed to dissipate within minutes upon drying. The color development and color dissipation is reversible over a large number of applications.

C. Reversible Color Development Composition Based on Ascending Temperature:

A simplified and intense ascending reversible color development coating composition is prepared using a single component phase separating color developer and a single component color former. 83% by weight of color developer glycerol monostearate (2,3-dihydroxypropyl C18, GMS) is heated to 180° F. to ensure complete melting and low viscosity. 17% by weight green color former (Pergascript™ green I-2GN, Ciba AG CH) is added as a powder, mixed and heated (>180° F.) until completely dissolved. The color former is observed to turn deep green as it dissolves to a rich dark green mixture. The mixture retains a deep green color provided that it remains molten. To the composition was added at one or more of acetate polymer ethyl vinyl acetate or acrylate polymers ethylene ethyl acrylate, ethylene methyl acrylate or ethylene butyl acrylate. Cooling to room temperature results in a transition of the formulation to an off-white slightly tinted waxy solid.

D. Reversible Ascending Temperature Color Development Substrates:

A reversible ascending temperature color change substrate is prepared using the reversible color development composition prepared in Example C. A solidified room temperature composition is heated to 160° F. until it is deep green and molten. The molten composition is then applied to paper substrates by a variety of standard coating processes. For convenience, the composition is roller coated on a standard 80 pound bonded white paper. Rollers are pre-warmed to ensure even coating.

Uniform coatings are applied to paper substrates. The coatings cool rapidly at room temperature (68° F.). Initially colored coatings turn from a deep green coloration to a translucent off white color upon cooling. The coating penetrates well into the paper substrate providing good stability on the paper. Cooled non-colored coatings are changed from colorless state to a colored state upon raising the temperature above the melting transition of the ascending color developer glycerol monostearate. The color completely reverses upon cooling back to room temperature. The ascending color change is reversible over continued repeated cycles and long term storage.

E. Micro-Encapsulation of Reversible Color Development Compositions Base on Ascending Temperature:

An ascending reversible color development coating composition is prepared using a single component phase separating color developer and a single component color former is prepared in accordance to Example C above. 83% by weight of a ascending color developer glycerol monostearate (2,3-dihydroxypropyl C18, GMS) is heated to 180° F. to ensure complete melting and low viscosity. 17% by weight green color former (Pergascript™ green I-2GN, Ciba AG CH) is added as a powder, mixed and heated (>180° F.) until completely dissolved. The color developer turns deep green as it dissolves to a rich dark green mixture. The mixture retains a deep green color provided that it remains molten. To the composition was added at one or more of acetate polymer ethyl vinyl acetate or acrylate polymers ethylene ethyl acrylate, ethylene methyl acrylate or ethylene butyl acrylate.

The mixture is homogenized and dispersed in an aqueous medium until the average particle size is 2 microns. The color former dispersion is then admixed by stirring first with a 70% strength by weight aqueous solution of melamine-formaldehyde resin (molar ratio of melamine:formaldehyde 1:6) and a 20% strength by weight aqueous solution of polyacrylamidomethylene-propanesulfonic acid in a weight ratio of 1:1 and subsequently with a normalizing amount of sodium dihydrogenphosphate. The mixture is then adjusted with formic acid to pH 4.2. After mixing at room temperature for one hour and the addition of 2.5 g of water, the mixture is stirred at 160° F. for 2 hours until curing was complete.

A micro-encapsulated slurry is obtained in approximately 30-40% by weight aqueous dispersion of ascending reversible color generating reverse leuco dye which is colorless at room temperature and becomes reversibly intensely colored above the melting transition of the co-developer/solvent GMS.

The micro-encapsulated composition subsequently is either separated and dried to a powder form to be admixed to non-aqueous printing vehicles such as UV curable ink resins or solvent based in resins or is used directly as an additive to aqueous slurry to be added to aqueous based printing vehicles.

F. Separate Reversible Red, Blue, and Green (RGB) Color Development Compositions Based on Ascending Temperature for Color Image Development:

Color enriched ascending reversible color development coating compositions are prepared using a novel single component phase separating color developer and a single component color formers. 80% by weight of an ascending color developer glycerol monostearate (2,3-dihydroxypropyl C18, GMS) is heated to 180° F. to ensure complete melting and low viscosity. 20% by weight either red, blue, or green color formers (Pergascript™, Ciba AG CH) are added as powders, mixed and heated (>180° F.) until completely dissolved. The color formers turn deep independent colors as they each dissolve. The mixtures retain a deep red, blue or green color provided that they remain molten. Cooling to room temperature results in a transition of the formulation to an off-white slightly tinted waxy solid.

Each RGB color development composition is utilized in a 3-color printing process to generate a realistic color image. The initial printing processes require careful plate positioning to ensure color registration. Color printing is accomplished while the color development compositions are elevated in temperature and in the colored state. Upon cooling to room temperature, the image disappears on the paper printing substrate. As the substrate is warmed, the image appears from a blank page reversibly until the page is cooled again back to room temperature. The reversible ascending temperature effect provides an unusual an unexpected image development process as compared to standard available leuco dye compositions that can only be used to reveal an underlying image.

G. Separate Reversible Red, Blue, and Green (RGB) Color Development Compositions and Generation of Hydrochromic Full Color Image Development:

Color enriched hydrochromic reversible color development coating compositions are prepared using novel color former/developer compositions. Pre-colored RGB reversible hydrochromic inks are prepared using independent two component solution mixtures containing developer and color former as described in Example I. The developer solutions are prepared using 10% by weight developer (Pergafast 201, Ciba AG CH) dissolved in 90% polyethylene glycol average molecular weight 1,450 g/mol (Sigma Chemicals). Each mixture is brought above 200° F. and mixed until the solution becomes clear.

Separate color former solutions are prepared using 20% by weight color developer Specialty Red, Specialty Blue, or Green (Emerald Hilton Davis, LLC) dissolved in 80% by weight polyethylene glycol average molecular weight 1,450 g/mol (Sigma Chemicals). The mixture is brought above 200° F. and mixed until the solution becomes clear.

Corresponding color developer solutions and color former solutions are kept heated mixed and kept independent. Slight colors are developed upon mixing. The solutions are allowed to cool to 160° F. 3 volumes of hot water (greater than 160° F.) are added during vigorous mixing. An immediate red, blue or green colored emulsion is formed and the solutions are allowed to thicken during cooling to room temperature. The concentrated slurries can be removed for addition to an ink vehicle or used directly as a coating ink.

The aqueous slurry inks are printed in RGB patterns on standard white bond paper. The coating is warm air dried. The initially colored—hydrated ink is converted to a colorless state during drying. Drying and conversion to a colorless state are facilitated using forced warm air.

Full color images, multi-colored markings, drawings, graphics, messages writing, symbols and the like can be generated by applying a water marker, pen, swab, or stamp to the colorless coated area of the paper. Colors generated by contact with water are observed to dissipate within minutes upon drying. Color image development and color dissipation are reversible over a large number of applications.

H. Coacervation Micro-Encapsulation of Reversible Color Development Compositions for Ascending Temperature Color Change Dyes:

150 ml 8% aqueous solution of 200 Bloom Type A Gelatin at 50° C. is combined together with 0.1 ml of n-octanol as a foam suppressant. 80 gm of 2,3-glycerol monostearate is pre-mixed with 20 gram color former Pergascript™ orange I-G (Ciba AG CH) and then mixed into the aqueous solution with agitation to form oil phase droplets in the range of 10-20 microns. The emulsion pH is adjusted to pH 5. 10 ml of a 28% solution of sodium polyaspartate diluted with an additional 40 ml of water is added to the emulsion during mixing. An additional 170 ml of distilled water is subsequently added. The pH of the mixture is then lowered to 4.4 by addition of glacial acetic acid. The mixture is cooled to about 10° C. and the pH lowered to pH 4.2. The solution is allowed to cool 45 minutes at 10° C. whereby 5 ml of a 25% glutaraldehyde solution is added and the mixture allowed to stay 12 hour at 22° C.

The micro-encapsulated composition is subsequently either separated and dried to a powder form to be admixed to non-aqueous printing vehicles such as UV curable ink resins or solvent based in resins or is used directly as an additive to aqueous slurry to be added to aqueous based printing vehicles.

I. Natural Co-Developer-Solvent Based Leuco Dye Compositions:

A natural co-developer-solvent leuco dye is prepared by pre-melting 80% camauba wax to 100° C. Color former is added at 20% by weight and mixed. The mixture is heated and mixed until the color developer is completely dissolved into a clear molten solution. The molten solution is allowed to cool to room temperature. Upon cooling the composition is solidified to a rich deep color. The solidified colored composition exhibited fully reversible color change characteristics upon heating and melting and chilling and solidification. The solidified composition could be used directly as a coating or converted to a powdered form for addition to printing vehicles, plastics extrusion compositions, injection molding compositions or the like.

J. Aqueous Coating and Product Additive Slurries Using Natural Co-Developer-Solvent Based Leuco Dye Compositions:

Aqueous slurries of natural co-developer-solvent based leuco dye compositions prepared as described in Example I above are emulsified using food-grade surfactants and ultra-sonication. A 20% by weight emulsifier solution of Protanal Ester BV 3750 (FMC Biopolymer) is prepared by adding and mixing the surfactant in stirring water at 70° C. until the emulsifier is completely dissolved. 50% by weight natural co-developer-solvent based leuco dye compositions are heated to a liquefied state (100° C.). 50% by weight pre-heated emulsifier solution is added and the mixture is sonicated using a 300 watt ultrasonicator probe. A uniform slurry emulsion is formed within 2 minutes of sonication. The slurry is allowed to cool to room temperature. The slurry may be used directly as a coating ink or utilized at various concentrations as an additive to ink vehicles. Pre-formed slurries can be further micro-encapsulated using standardized micro-encapsulation processes describe above.

K. Leuco Dye/Polydiacetylenic Combinatorial Compositions in which Diacetylenic Moieties Serve as Color Developers and Possess Intrinsic Color Change Polymer Characteristics:

10% by weight color formers—either red, blue, or green (Pergascript™, Ciba AG CH) and 10% by weight 10,12-tricosadiynoic acid (C23) are dissolved is dichloromethane. The presence of the free monomeric C23 acid initiates color development in solution. The solutions are tinted relative to the color type. Each formulation is dried on to paper. The resulting colors are rich in hue. Each color type exhibits a reversible color change when elevated above 160° F.

Dried color draw-downs are subsequently exposed to UV light (254 nm) resulting in the formation of an additional blue hue to each color type exposed. The blue hue s generated by the topochemical polymerization reaction forming the ene-yne polydiacetylenic polymer backbone. The blue hue may be irreversibly changed to a red hue during heating or through frictionally induced mechanochromic triggering. The leuco dye reversible color change is convoluted with the polydiacetylenic color transition.

L. Solvent Based Compositions for Inkjet, Drop-on-Demand, and Continuous Inkjet Printing:

10-15% by weight color formers and developers are dissolved in solvent systems including ratios of chloroform, methylethyl ketone, and alcohol types. Soluble resins such as polyethylene glycol and other soluble, but adherent polymers may be used. Soluble solutions are used directly as printing ink compositions in various inkjet, drop-on-demand, and continuous inkjet printing formats.

M. Plastic-Wood Pseudo Master Batch:

Wood flour is finely pulverized wood that has a consistency fairly equal to sand or sawdust, but can vary considerably, with particles ranging in size from a fine powder to roughly the size of a grain of rice. Most wood flour manufacturers are able to create batches of wood flour that have the same consistency throughout. All high quality wood flour is made from hardwoods because of its durability and strength. Very low-grade wood flour is occasionally made from sapless softwoods such as pine or fir. Wood flour is commonly used as a filler in thermosetting resins such as bakelite, and in linoleum floor coverings. Wood flour is also the main ingredient in wood/plastic composite building products such as decks and roofs. Prior to 1920, wood flour was used as the filler in thick Edison Diamond Discs.

Wood flour has found a use in plugging small through-wall holes in leaking main condenser (heat exchanger) tubes at electrical power generating stations via injecting small quantities of the wood flour into the cooling water supply lines. Some of the injected wood flour clogs the small holes while the remainder exits the station in a relatively environmentally benign fashion. Large quantities of wood flour are frequently to be found in the waste from woodworking and furniture companies. An adaptive reuse to which this material can be directed is composting.

Emulsifying wood powder-flour with plasticizing emulsifiers and in combination, emulsifying and dispersing powderized plastics and dyes provides for an several advantages of create new plastic-wood product based on pseudo master batch formulations. Intrinsically, wood is a hydrophilic composition as compared to plastic primarily being hydrophobic in composition. Pseudo master batch formulations and processes provide an enabling method to enhance plastic wood dispersion, alter the individual characteristics of each component, provide for the use of recycled wood products and plastic products, reduces the steps required for materials processing compared to conventional methods of combining wood and plastic compositions, dramatically improve the environmental impact producing plastic-wood products compared to conventional processing techniques, and improve manufacturing efficiencies and therefore reduce overall cost and pricing to consumers.

Pseudo master batch plastic-wood can be compounded utilizing either dry or pre-dampened wood powder/flour mixed at specified rations with a pre-powderized granulated plastic composition. The mixture is homogenized and treated in a single-continuous mixing step with a liquid plasticizing emulsifier and any desired ancillary dye or treatment agent (e.g. lubricating agent, preservative, UV inhibitor, anti-caking agent, slip agent, or the like). The compounded and mixed composition can be dried by any of a variety of means to a level of less than 1% water and made ready for extrusion to plasticized pellets, directly utilized for plastics processing or stored for later use.

Upon compounding and drying, pseudo master batch plastic-wood can be either further palletized by extrusion in to resin based pellets and used or sold for industrial processing into products or used directly in a powderized form in extrusion or injection molding. By way of example, wood-plastic coffee stir stick can be extruded into forms, sizes and shapes consistent with standard wooden coffee stir sticks. The color can be adjusted to create a wood-like look. A texture can be embossed to give the stick a wood-like appearance and feel. Wood-plastic products produced from pseudo master batch processes have significant market and product advantages including but not limited to: ecological benefits in that both recycled wood and plastic can be utilized; the wood component in the end product will improve bio-degradation compared to plastic alone in landfills; further environmental benefits since less deforestation and petroleum utilization are desirable; cost benefits over virgin plastic or wood products in that fully recycled plastic and wood can be utilized; sterilization due to the high temperature processing utilized; and rapid and efficient production to further reduced costing and ultimate consumer pricing.

N. Lab Scale Thermochromic Micro-Encapsulation Using Interfacial Polymerization:

Materials:
Materials for Micro-Encapsulation:
Distilled water (dH2O)
Sigma Aldrich Poly(methyl vinyl ether-alt-maleic anhydride copolymer) [MVEMAC], item #416339, CAS #9011-16-9
Sigma Aldrich 1-Tetradecanol and 1-Hexadecanol (or other oil phase medium)
Sigma Aldrich Bisphenol AP (4,4'-(1-Phenylethylidene) bisphenol. Item #450456, CAS #1571-75-1
Color Formers Blue 5, Green 2 and Red
Sigma Aldrich Poly(melamine-co-formaldehyde), methylated, 84 wt % solution in 1-butanol, item #418560
5% Sodium Hydroxide solution in dH2O [EMD Chemicals Sodium Hydroxide, item #SX0593-1, CAS #1310-73-2]
5% Acetic Acid solution in dH2O [EMD Chemicals Acetic Acid, Glacial, item #AX0073-6, CAS #64-19-7]
Warm dH2O, heated in microwave or oil bath
Hot oil bath filled with Crystal Plus Mineral Oil T500
125 mL Erlenmeyer glass flask with magnetic stir bar inside
Hot air gun and vortex
2 small scintillation vials
30 mL glass vial, VWR item #VW60910A-8
Omni GLH-115 Homogenizer and 10 mm rotor stator probe
Parafilm, spatula or wooden coffee sticks, disposable 1 mL plastic pipets Procedure:
1. At least two hours before starting microencapsulation, prepare a 5% solution of MVEMA in dH2O. In the 125 mL Erlenmeyer flask, add 5 g of MVEMAC to 95 mL of dH2O. Cover the end with parafilm and heat the flask in the oil bath at 60° C. for at least two hours, or until solution becomes completely transparent, though a slight yellowish hue is fine. Store solution in refrigerator when not in use.
2. Preheat the oil bath to 85° C. with a stir speed of 300.
3. Measure 10.4 g of 5% MVEMAC into a 30 ml vial and place into the oil bath at an angle. Allow the solution to equilibrate, about 30 minutes. Leave the cap on loosely so the water in the solution does not evaporate out.
4. In a small scintillation vial, add 3.4 g of oil phase (1-Tetradecanol), 0.96 g of color developer (Bisphenol AP), and 0.48 g of color former (Blue 5). Heat with the hot air gun and vortex until color former is dissolved and solution is transparent. Add solution to the 30 ml vial. Do not overheat the solution or else the dye will burn causing discoloration in the final capsules.
5. Tape the hole near the top of the 10 mm probe closed. Screw in the 10 mm probe and insert it towards the bottom of the vial and run the homogenizer at speed 1. Move the homogenizer up and down a few times to ensure homogenous mixing. After a minute, increase the speed to 2, then after another minute up to speed 3.
6. Add 1 mL (~32 drops) of 5% NaOH dropwise into the vial, moving the homogenizer up and down to mix. Run reaction for 15 minutes.
7. Half-fill a scintillation vial with melamine formaldehyde. Using the hot air gun, heat the vial containing melamine formaldehyde until it is liquid (~1 min). Move the probe to the side and add 1 mL of melamine formaldehyde. Move probe up and down to ensure proper mixing. After a minute, repeat the process four more times until 5 mL (~2.8 g) of melamine formaldehyde is added. Do not add too quickly or else the slurry will coagulate and thicken unevenly. Run reaction for another 15 minutes.
8. Gradually add 1 mL (~32 drops) of 5% acetic acid dropwise, four drops at a time, moving the probe up and down. Reduce the rotor stator speed to 2.6 (two clicks). Run the reaction for 15 minutes then add another 1 mL of acetic acid dropwise, eight drops at a time, moving the probe up and down. Reduce the rotor stator speed to 2 (three more clicks). Run the reaction for another 15 minutes. Shut off homogenizer.

While running the reaction, use an applicator stick to place a sample onto a piece of paper at the following intervals: after adding NaOH, after adding melamine formaldehyde, after each addition of acetic acid, and at the end. Use the hot air gun to test color fading. Record results in notebook.

O. Thermochromic Pseudo Master Batch Scale Up Using Single Polyethylene Resin

For industrial scale processing, 24 kg pseudo master batch wet powder was prepared using 30% by weight aqueous thermochromic slurry (19° C. blue, BPA-free at 50% by weight micro-encapsulated pigment, Segan Industries, Inc. CA), 10% by weight aqueous liquid surfactant (Michelman Corp. ME09730-FD), and 60% by weight powered/pulverized polyethylene (ROTO PE 625662, Ashland Distribution). One example sequence of addition includes pre-coating the powdered polyethylene carrier resin by continuously mixing it in an agitation mixer, adding the liquid emulsion and then continuing to mix until the polyethylene powder is uniformly wetted by the emulsion (10 minutes). The thermochromic slurry is then added consistently to the mixing composition and the mixing is continued until the composition is thoroughly mixed and homogenized (10 minutes).

Once mixing is complete, the wet theromochromic pseudo master batch is then dried to a uniform granular flowing powder. Upon drying, the dried pseudo master batch can be further compounded prior to utilization or processing by the addition of lubricants such as ethylene bis(stearamide) and color stabilizers described in this case such as ethyl vinyl acetate. Typically ethylene bis(stearamide) (EBS), is added at 3-4% of the powdered pseudo master batch used and ethyl vinyl acetate is added at 15% of the powdered pseudo master batch used.

Each component was added to a mixing vessel and mixed thoroughly to a uniform paste. The paste was flash spray dried in a drum dryer at below the melting transition of the PE (210° F.) and collected as a large granulated composition (0.1 inch diameter average particle size). Dried pseudo master batch could be used directly for PE or PP extrusion or injection molding applications between 2% to 10% by weight in the molding resin. Molded articles prepared with pseudo master batch showed good color uniformity and thermochromic color change activity at the intended temperature for use.

P. Thermochromic Pseudo Master Batch Scale Up Using Dual Polyethylene Resin

For industrial scale processing, 24 kg pseudo master batch wet powder was prepared using 30% by weight aqueous thermochromic slurry (30° C. blue, BPA-free at 50% by weight micro-encapsulated pigment, Segan Industries, Inc. CA), 10% by weight aqueous liquid surfactant (Michelman Corp. ME09730-FD), and 30% by weight powered/pulverized polyethylene (ICO Polymers, LLP 8555.25) and 30% by weight additional polyethylene (BAPOL, LLDPE 2272G). One example sequence of addition includes pre-coating the powdered polyethylene carrier resin by continuously mixing it in an agitation mixer, adding the liquid emulsion and then continuing to mix until the polyethylene powder is uniformly wetted by the emulsion (10 minutes). The thermochromic slurry is then added consistently to the mixing composition and the mixing is continued until the composition is thoroughly mixed and homogenized (10 minutes).

Once mixing is complete, the wet theromochromic pseudo master batch is then dried to a uniform granular flowing powder. Upon drying, the dried pseudo master batch can be further compounded prior to utilization or processing by the addition of lubricants such as ethylene bis(stearamide) and color stabilizers described in this case such as ethyl vinyl acetate. Typically ethylene bis(stearamide) (EBS), is added at 3-4% of the powdered pseudo master batch used and ethyl vinyl acetate is added at 15% of the powdered pseudo master batch used.

Each component was added to a mixing vessel and mixed thoroughly to a uniform paste. The paste was dried in laminar forces air drier system at 120° F. for 2 hours and collected as a large granulated composition (0.1 inch diameter average particle size). Dried pseudo master batch could be used directly for PE or PP extrusion or injection molding applications between 2% to 10% by weight in the molding resin. Alternatively, the resulting pseudo master batch could be palletized using an extrusion palletizing unit with zone temperatures of 80° C. for 6 temperature zones, 85° C. for zone 7, a materials handling zone at 120° C., and a die extrusion zone at 120° C. Pellets were cleaved, cooled, and dried using a front face water ring pelletinzing system. Final pellets could be used in injection molding and extrusion from between 3% to 10% by weight.

Q. Evanescent Micro-Encapsulation Formulation

Prepare for the micro-encapsulation by heating up 20.8 g of the previously prepared solution of 10% Poly Methyl Vinyl Ether-Alt-Maleic Anhydride in de-ionized H2O (MVEMA) in an oil bath to 75*C for 30 minutes. Also, measure out 12 mL of melamine formaldehyde into a spice jar and leave it in the oil bath, until ready to be use. During that time, ensure that the rotorstator used to emulsify the microencapsulated solution is sufficiently cleaned and ready to use. The rotorstator blends the micro-encapsulation solution into a consistent slurry, making it easier for the encapsulations to form. Throughout the experiment, move the rotorstator around the spice jar to ensure complete micro-encapsulation of the whole solution within.

In an amber, UV protected vial, put 6.8 g of oil phase medium and 0.12 g of D&C dye. The lower the melting point of the oil phase medium, the easier the micro-encapsulation process will progress and the more significant the evanescent will be. The purpose of this experiment is to achieve an encapsulation where the D&C dyes are encased in the capsule so that they do not stain, but still evanesces when exposed to light.

Further reactions are performed in a dark room using red lighting, adequately protected from all potential UV light, for the duration of the experiment and take measures to prevent exposure to light. Heat up the oil phase medium and dye mixture with a hot air gun until the oil phase medium has melted completely and mixed together with the dye. Wait until the mixture has solidified, then add 1.2 g of the TPO-L photo-initiator and heat with the hot air gun until the mixture is completely blended. Before the mixture hardens, pour it into the heated MVEMA solution and promptly turn on the rotorstator to begin emulsifying. Gradually increase the rotorstator speed for a few minutes. Slowly drop 2 g of a 5% NaOH solution into the micro-encapsulation. Run the reaction for 5 minutes and add the melamine formaldehyde 1 mL at a time. Following the formaldehyde, drop 4 g of 5% Acetic Acid solution and lower the rotorstator speed to one. Allow the encapsulation to emulsify for 5 minutes before slowly turning off the rotorstator and taking the spice jar out of the hot oil bath.

The micro-encapsulation is cooled slowly (30 minutes), either left in the oil bath until completely cool or wrapped with aluminum foil to slower the decreasing rate of temperature. Once completely cool, the micro-encapsulation can be tested as a slurry for effectiveness and optimization through a light test; establish a control for this test by covering up part of the test strip for later observation. Also, record the date and time of the light test, along with the amount of time it takes to evanesce, to further test in different environments of light exposure.

R. Scaled Up Evanescent Dye Pseudo Master Batch Production

For industrial scale processing, 24 kg pseudo master batch wet powder was prepared using 30% by weight aqueous evanescent slurry (prepared above at 50% by weight micro-encapsulated pigment, Segan Industries, Inc. CA), 10% by weight aqueous liquid surfactant (Michelman Corp. ME09730-FD), and 30% by weight powered/pulverized polyethylene (ICO Polymers, LLP 8555.25) and 30% by weight additional polyethylene (BAPOL, LLDPE 2272G). One example sequence of addition includes pre-coating the powdered polyethylene carrier resin by continuously mixing it in an agitation mixer, adding the liquid emulsion and then continuing to mix until the polyethylene powder is uniformly wetted by the emulsion (10 minutes). The evanescent slurry is then added consistently to the mixing composition and the mixing is continued until the composition is thoroughly mixed and homogenized (10 minutes).

Once mixing is complete, the wet evanescent pseudo master batch is then dried to a uniform granular flowing powder. Upon drying, the dried pseudo master batch can be further compounded prior to utilization or processing by the addition of lubricants such as ethylene bis(stearamide) and color stabilizers described in this case such as ethyl vinyl acetate. Typically ethylene bis(stearamide) (EBS), is added at 3-4% of the powdered pseudo master batch.

Each component was added to a mixing vessel and mixed thoroughly to a uniform paste. The paste was dried in laminar forces air drier system at 120° F. for 2 hours and collected as a large granulated composition (0.1 inch diameter average particle size). Dried pseudo master batch could be used directly for PE or PP extrusion or injection molding applications between 2% to 10% by weight in the molding resin. Alternatively, the resulting pseudo master batch could be palletized using an extrusion palletizing unit with zone temperatures of 80° C. for 6 temperature zones, 85° C. for zone 7, a materials handling zone at 120° C., and a die extrusion zone at 120° C. Pellets were cleaved, cooled, and dried using a front face water ring pelletinzing system. Final pellets could be used in injection molding and extrusion from between 3% to 10% by weight.

S. Fluorescent Pink Pseudo Master Batch:

For industrial scale processing, 24 kg pseudo master batch wet powder was prepared using 20% by weight aqueous pink fluorescent slurry (Aurora Pink, SPL-12J pigment, Dayglo Corp.), 10% by weight aqueous liquid surfactant (Michelman Corp. ME09730-FD), and 35% by weight powered/pulverized polyethylene (ICO Polymers, LLP 8555.25) and 35% by weight additional polyethylene (BAPOL, LLDPE 2272G). One example sequence of addition includes pre-coating the powdered polyethylene carrier resin by continuously mixing it in an agitation mixer, adding the liquid emulsion and then continuing to mix until the polyethylene powder is uniformly wetted by the emulsion (10 minutes). The fluorescent slurry is then added consistently to the mixing composition and the mixing is continued until the composition is thoroughly mixed and homogenized (10 minutes).

Once mixing is complete, the wet fluorescent pseudo master batch is then dried to a uniform granular flowing powder. Upon drying, the dried pseudo master batch can be further compounded prior to utilization or processing by the addition of lubricants such as ethylene bis(stearamide) and color stabilizers described in this case such as ethyl vinyl acetate. Typically ethylene bis(stearamide) (EBS), is added at 3-4% of the powdered pseudo master batch used and ethyl vinyl acetate is added at 15% of the powdered pseudo master batch used.

Each component was added to a mixing vessel and mixed thoroughly to a uniform paste. The paste was dried in laminar forces air drier system at 120° F. for 2 hours and collected as a large granulated composition (0.1 inch diameter average particle size). Dried pseudo master batch could be used directly for PE or PP extrusion or injection molding applications between 2% to 10% by weight in the molding resin. Alternatively, the resulting pseudo master batch could be palletized using an extrusion palletizing unit with zone temperatures of 80° C. for 6 temperature zones, 85° C. for zone 7, a materials handling zone at 120° C., and a die extrusion zone at 120° C. Pellets were cleaved, cooled, and dried using a front face water ring pelletinzing system. Final pellets could be used in injection molding and extrusion from between 3% to 10% by weight.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of making a pseudo master batch composition, the method comprising:
   contacting an aqueous composition and a powdered plastic resin with a plasticizing emulsifier to produce a plasticized composition; and
   flash drying the plasticized mixture to produce a pseudo master batch composition.

2. The method according to claim 1, wherein the aqueous composition is a slurry.

3. The method according to claim 1, wherein the aqueous composition comprises a compound from the group consisting of dyes, thermochromic agents, photochromic agents and pigments.

4. The method according to claim 3, wherein the aqueous composition comprises a leuco dye.

5. The method according to claim 1, wherein flash drying comprises spray drying.

6. The method according to claim 1, wherein flash drying produces a granular pseudo master batch composition.

7. The method according to claim 1, wherein the aqueous composition comprises a color change composition, the color change composition comprising:
   a composition comprising a color former and a color developer that transitions from a first color state to a second color state upon application of an applied stimulus, wherein the color former changes color in response to a phase transition of the color developer; and an amount of a copolymer sufficient to eliminate background color of the composition during transition from a first color state to a second color state.

8. The method according to claim 7, wherein the copolymer comprises the formula:

where n is an integer from 10 to 1000, m is an integer from 10 to 1000 and R is an alkyl, substituted alkyl, alkenyl, substituted alkenyl, alkynyl, substituted alkynyl, acyl, substituted acyl, acyloxy, substituted acyloxy, alkoxycarbonyl, substituted alkoxycarbonyl, carboxyl or substituted carboxyl.

9. The method according to claim 8, wherein the copolymer comprises the formula:

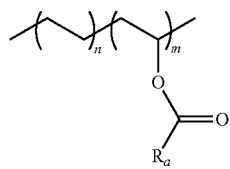

wherein:
n is an integer from 10 to 1000;
m is an integer from 10 to 1000; and
$R_a$ is hydrogen, alkyl or substituted alkyl.

10. The method according to claim 8, wherein the copolymer comprises the formula:

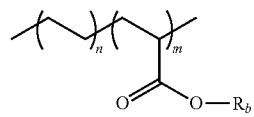

wherein:
n is an integer from 10 to 1000;
m is an integer from 10 to 1000; and
$R_b$ is hydrogen, alkyl or substituted alkyl.

11. The method according to claim 1, wherein the aqueous composition comprises wood.

12. The method according to claim 11, wherein the aqueous composition comprises a slurry of wood powder.

13. The method according to claim 1, wherein the aqueous composition comprises recycled materials.

14. The method according to claim 13, wherein the recycled materials is selected from the group consisting of recycled wood, recycled plastic, recycled paper, recycled glass, recycled asphalt, recycled concrete and recycled cement.

* * * * *

UNITED STATES PATENT AND TRADEMARK OFFICE
CERTIFICATE OF CORRECTION

PATENT NO. : 10,570,294 B2  
APPLICATION NO. : 15/354872  
DATED : February 25, 2020  
INVENTOR(S) : Hans O. Ribi Page 1 of 1

It is certified that error appears in the above-identified patent and that said Letters Patent is hereby corrected as shown below:

In the Specification

Please replace "camauba wax" with -- carnauba wax -- (Column 18, Line 65).

Please replace "camauba wax" with -- carnauba wax -- (Column 19, Line 1).

Signed and Sealed this  
Fifth Day of May, 2020

Andrei Iancu  
*Director of the United States Patent and Trademark Office*